US012762051B2

(12) United States Patent
Lee et al.

(10) Patent No.: US 12,762,051 B2
(45) Date of Patent: Oct. 13, 2026

(54) STORAGE DEVICE SUPPORTING VIRTUAL GROUPS AND OPERATING METHOD OF STORAGE DEVICE

(71) Applicant: SAMSUNG ELECTRONICS CO., LTD., Suwon-si (KR)

(72) Inventors: Chulseung Lee, Suwon-si (KR); Bokyoung Kim, Suwon-si (KR); Hyunsub Kim, Suwon-si (KR); Hyewon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/941,574

(22) Filed: Nov. 8, 2024

(65) Prior Publication Data

US 2025/0225073 A1 Jul. 10, 2025

(30) Foreign Application Priority Data

Jan. 10, 2024 (KR) ........................ 10-2024-0004486

(51) Int. Cl.
*G06F 12/02* (2006.01)

(52) U.S. Cl.
CPC .. *G06F 12/0246* (2013.01); *G06F 2212/7201* (2013.01); *G06F 2212/7202* (2013.01)

(58) Field of Classification Search
None
See application file for complete search history.

(56) References Cited

U.S. PATENT DOCUMENTS 6,389,514 B1 * 5/2002 Rokicki .............. G06F 12/0215 711/3
9,417,912 B2 8/2016 Suh et al.
11,237,979 B2 2/2022 Shin et al.
2009/0019232 A1 1/2009 Deshpande et al.
2016/0019160 A1 * 1/2016 Mohan ................ G06F 12/0246 711/208
2018/0173619 A1 * 6/2018 Sivasankaran ........ G06F 3/0679
2023/0153238 A1 5/2023 Kang
2023/0222025 A1 7/2023 Kumar et al.

FOREIGN PATENT DOCUMENTS

CN 105095290 B 2/2019
KR 10-1381597 B1 4/2014

* cited by examiner

*Primary Examiner* — Michael Alsip
(74) *Attorney, Agent, or Firm* — Sughrue Mion, PLLC

(57) ABSTRACT

A storage device a nonvolatile memory device that stores or read data, and a controller that controls the nonvolatile memory device based on a first physical address of the nonvolatile memory device and performs a data input/output request from a host. The controller generates the first physical address based on bit information being bits at a preset bit position in a logical address associated with the data input/output request and based on a second physical address of the nonvolatile memory device stored in a mapping table. The mapping table includes information about a correlation of the logical address and the second physical address.

20 Claims, 18 Drawing Sheets

20

STORAGE DEVICE SUPPORTING VIRTUAL GROUPS AND OPERATING METHOD OF STORAGE DEVICE

CROSS-REFERENCE TO RELATED APPLICATION

This application claims priority under 35 U.S.C. § 119 to Korean Patent Application No. 10-2024-0004486 filed on Jan. 10, 2024, in the Korean Intellectual Property Office, the disclosure of which being incorporated by reference herein in its entirety.

BACKGROUND

Embodiments of the present disclosure described herein relate to a storage device supporting a plurality of virtual groups and an operating method of the storage device.

Data are increasing with the development of artificial intelligence (AI) technologies. This increase in data may cause the increase in a storage capacity of a data center. A storage device which is implemented based on a semiconductor device provides higher input/output (I/O) performance and lower energy consumption than a hard disk drive (HDD), and thus, the use of the semiconductor device-based storage device in a data center and a cloud computing environment is increasing.

To perform an input/output of data requested from a host, the semiconductor device-based storage device needs to translate a logical address received from a host into a physical address of the storage device. As the storage capacity of the storage device increases, the size of information for correlating a logical address with a physical address also increases. There are being developed various technologies for translating a logical address into a physical address.

SUMMARY

It is an aspect to provide a storage device capable of reducing the size of information for correlating a logical address with a physical address and an operating method thereof.

It is another aspect to provide a storage device capable of reducing the size of information for correlating a logical address with a physical address while supporting the management of a plurality of virtual groups and an operating method thereof.

According to an aspect of one or more embodiments, a storage device may include at least one nonvolatile memory device that stores or read data, and a controller that controls the at least one nonvolatile memory device based on a first physical address of the at least one nonvolatile memory device and performs a data input/output request from a host. The controller may generate the first physical address based on bit information being bits at a preset bit position in a logical address associated with the data input/output request and based on a second physical address of the at least one nonvolatile memory device stored in a mapping table, and the mapping table may include information about a correlation of the logical address and the second physical address.

According to another aspect of one or more embodiments, a storage device may include at least one nonvolatile memory device configured to store or read data, and a controller configured to control the at least one nonvolatile memory device and to perform a workload requested by a host. The controller is configured to divide the at least one nonvolatile memory device into a plurality of virtual groups, based on bit information being bits at a preset bit position in a logical address associated with the workload and based on a physical address of the at least one nonvolatile memory device stored in a mapping table, and perform the workload based on the plurality of virtual groups.

According to yet another aspect of one or more embodiments, a method which is performed by a controller of a storage device may include receiving, at the controller, a data input/output request and a logical address associated with the data input/output request from a host, determining, at the controller, a logical page number based on the logical address, determining, at the controller, a second physical address based on the logical page number and a mapping table, generating, at the controller, a first physical address based on the second physical address and bit information being bits at a preset bit position in the logical page number, and controlling, at the controller, at least one nonvolatile memory device based on the first physical address to perform an input/output of data associated with the data input/output request. The mapping table includes information about a correlation of the logical page number and the second physical address.

BRIEF DESCRIPTION OF THE FIGURES

The above and other aspects will become apparent by describing in detail embodiments thereof with reference to the accompanying drawings.

DETAILED DESCRIPTION

Below, various embodiments will be described in detail and clearly to such an extent that an ordinary one in the art easily carries out the present disclosure.

Figure 1:
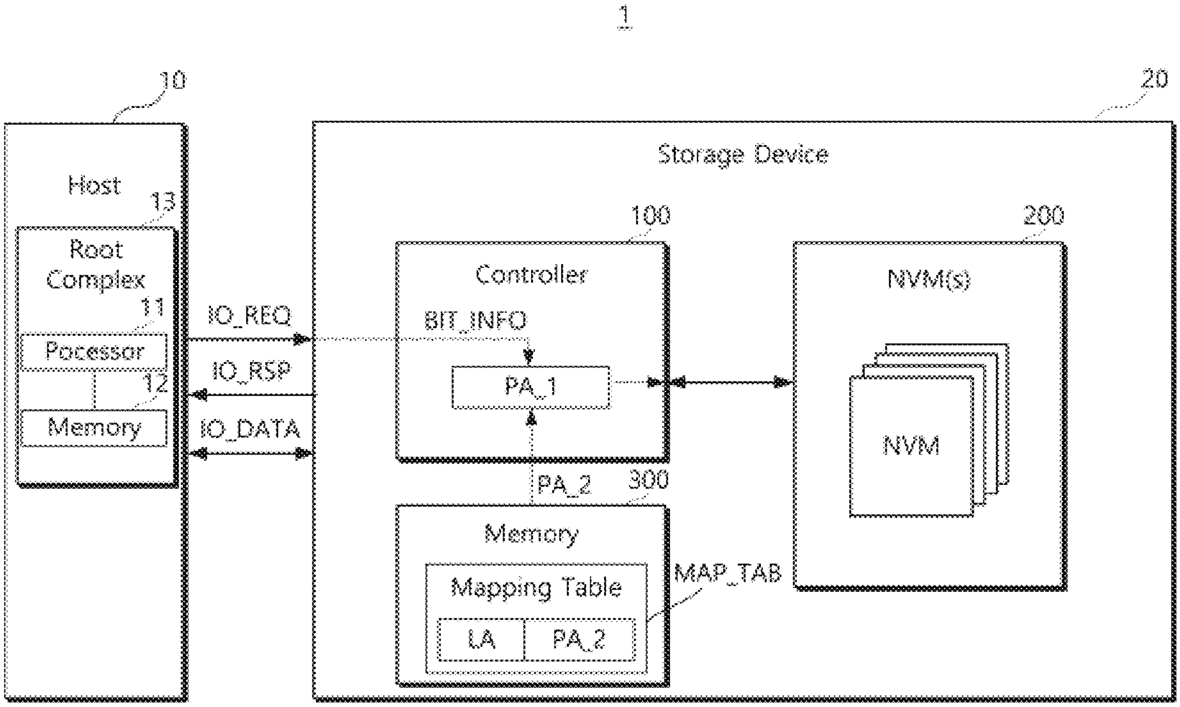
FIG. 1 is a block diagram illustrating a host-storage system according to an embodiment.

FIG. 1 is a block diagram illustrating a computing system 1 including a storage device according to an embodiment.

A storage device 20 according to an embodiment may include a mapping table MAP_TAB which stores information about a correlation between a logical address received from a host 10 and a physical address of a nonvolatile memory device 200. The storage device 20 may generate a physical address for accessing the nonvolatile memory device 200 by using a logical address provided from the host 10 and a physical address stored in the mapping table MAP_TAB. The storage device 20 may access the nonvolatile memory device 200, which is managed by using a plurality of virtual groups, based on the generated physical address. The storage device 20 may distinguish different virtual groups of the nonvolatile memory device 200 based on the generated physical address. In an embodiment, in the generated physical address, bit information for distinguishing different virtual groups of the nonvolatile memory device 200 may be based on a logical address which the host 10 provides.

Below, description will be given in detail with reference to FIG. 1. Referring to FIG. 1, the computing system 1 may include the host 10 and the storage device 20. Configurations of the host 10 and the storage device 20 will be described with reference to FIG. 1. The host 10 may communicate with a plurality of storage devices. Configurations of the remaining storage devices not illustrated in FIG. 1 may be the same as or similar to the configuration of the storage device 20 and thus repeated description thereof is omitted for conciseness.

The host 10 controls an overall operation of the storage device 20. The host 10 may transmit a request IO_REQ for an input/output (I/O) of data to the storage device 20 and may receive a response IO_RSP to the data input/output from the storage device 20 as a response to the request IO_REQ. The host 10 may transmit data IO_DATA to be written in the nonvolatile memory device 200 to the storage device 20 together with the input/output request IO_REQ for data or may receive the data IO_DATA, which are read from the nonvolatile memory device 200 in response to the input/output request IO_REQ for data, from the storage device 20.

In this specification, the expression "write data in the nonvolatile memory device 200" is used synonymously with "store data in the nonvolatile memory device 200" or "program data in the nonvolatile memory device 200".

The host 10 may include a processor 11 and a memory 12. In an embodiment, the memory 12 may be a volatile memory device.

In some embodiments, the host 10 may include a data center server, a cloud server, a personal computer, a laptop computer, etc. In some embodiments, the host 10 may be a computing device which includes the processor 11 configured to process data.

In an embodiment, the processor 11 and the memory 12 may constitute a root complex 13 of the host 10. In some embodiments, the root complex 13 may further include a memory controller, a network port, a network interface, etc.

The root complex 13 which is a sub-system of the host 10 may include a function for an interconnection and/or a bridge with internal components and/or peripheral devices. In the embodiment to be described with reference to FIG. 1, the description will be given based on a configuration in which the processor 11 is implemented inside the root complex 13 but this is only an example and, in some embodiments, the root complex 13 and the processor 11 may be independently implemented.

The processor 11 may be a central processing unit (CPU), an application-specific integrated circuit (ASIC), a field programmable gate array (FPGA), or any other type of processing device implemented by a software command, a micro code, and/or firmware. The processor 11 may include a plurality of processors.

The root complex 13 is connected to the memory 12. The memory 12 may include a static random access memory (SRAM) or a dynamic random access memory (DRAM). The memory 12 may be implemented with a plurality of memory modules. The memory 12 may store program code which is executed by the processor 11. For example, the processor 11 may access the memory 12 and execute the program code to cause the processor 11 to implement various functions described further below.

In an embodiment, a portion of the memory 12 of the host 10 may be provided as a host memory buffer (HMB) to the storage device 20. That is, the portion of the memory 12 of the host 10 may be used as a working memory of the storage device 20.

The storage device 20 may be electrically connected to the host 10 and may be used by the host 10. The storage device 20 may include a controller 100 and at least one nonvolatile memory device (NVM) 200.

The storage device 20 may be implemented in a state of being physically separated from the host 10 or may be implemented with a form factor installed in a same package as the host 10. For example, in some embodiments, the storage device 20 may be implemented based on the E1.S, E1.L, E3.S, E3.L, or PCIe AIC (CEM) form factor. In some embodiments, the storage device 20 may be implemented based on the U.2 form factor, the M.2 form factor, or any other PCIe form factor.

In an embodiment, the storage device 20 may be coupled to a storage interface bus such that it is possible for the storage device 20 to communicate with any other components of the host 10 through the storage interface bus. According to an embodiment, the storage device 20 may be directly installed in a physical port which is based on the peripheral component interconnect express (PCIe). In an embodiment, the storage interface bus may be, for example, a PCIe bus. The host 10 may exchange data with the storage device 20 through the storage interface bus by using a storage interface protocol. The data may include user data. In some embodiments, the storage interface protocol may be, for example, a compute express link (CXL) protocol and/or a non-volatile memory host controller express (NVMe) protocol.

The storage device 20 may include the controller 100 and the at least one nonvolatile memory device (NVM) 200. In an embodiment, in which a plurality of nonvolatile memory devices (NVMs) 200 are provided, it will be understood that each NVM has a similar structure and function and thus references to the nonvolatile memory device 200 below apply to each NVM in such an embodiment.

The controller 100 may control the nonvolatile memory device 200 to perform the input/output request IO_REQ of the host 10. The input/output request IO_REQ may indicate a write operation, a read operation, and/or an erase operation of user data which the host 10 requests from the storage device 20.

The nonvolatile memory device (NVM) 200 may include a flash memory of a two-dimensional (2D) structure or a three-dimensional (3D) structure. The flash memory may include different kinds of nonvolatile memories such as a NAND flash memory, a vertical NAND (V-NAND) flash memory, a NOR flash memory, a magnetic RAM (MRAM), a phase-change RAM (PRAM), a ferroelectric random access memory (FRAM), a spin transfer torque random access memory (STT-RAM), and/or a resistive RAM (RRAM).

The storage device 20 may include a memory 300. In an embodiment, the memory 300 may be a volatile memory device. At least a portion of the memory 300 may be used as a working memory. The working memory may include a buffer memory which temporarily stores user data to be record at the nonvolatile memory device 200 or user data read from the nonvolatile memory device 200. According to an embodiment, when the host 10 provides the host buffer memory to the storage device 20, the host buffer memory may be used as the working memory of the storage device 20. In some embodiments, the mapping table MAP_TAB which is used to translate a logical address provided from the host 10 into a physical address used to access the nonvolatile memory device 200 may be temporarily stored in the working memory. In an embodiment, the mapping table MAP_TAB may include information about a correlation between a logical address LA and a second physical address PA_2. The second physical address PA_2 may be a physical address corresponding to the logical address LA. The memory 300 may include volatile memory cells. For example, the memory 300 may include a dynamic random access memory (DRAM) and/or a static random access memory (SRAM). An example in which the memory 300 is disposed independently of the controller 100 is illustrated in FIG. 1, but embodiments are not limited thereto and, in some embodiments, at least a portion of the memory 300 may be disposed inside the controller 100.

The storage device 20 according to an embodiment may manage the nonvolatile memory device 200 based on the plurality of virtual groups. That is, the storage device 20 may allocate a plurality of memory devices of the nonvolatile memory device 200 to different virtual groups and may access memory devices allocated to each virtual group through information for distinguishing the virtual groups. In this case, the storage device 20 may access the memory devices allocated to each virtual group by using a first physical address PA_1. The first physical address PA_1 may include information for distinguishing virtual groups from each other, and information for accessing sub-components (e.g., a plane, a block, a page, and/or a map unit) of memory devices allocated to each virtual group.

The controller 100 of the storage device 20 may generate the first physical address PA_1 based on the mapping table MAP_TAB stored in the memory 300 and the logical address provided from the host 10. For example, the controller 100 may generate the first physical address PA_1 based on the second physical address PA_2 stored in the mapping table MAP_TAB and a logical page number LPN. The logical page number LPN may be determined based on a logical block address LBA being the logical address which the host 10 provides.

The controller 100 may generate the first physical address PA_1 based on some of data bits constituting the logical page number LPN. For example, the controller 100 may generate some of data bits constituting the first physical address PA_1 by using bit information BIT_INFO being one or more data bits corresponding to a position of a preset bit of the data bits constituting the logical page number LPN.

In an embodiment, the controller 100 may generate bit data for distinguishing virtual groups from each other in the first physical address PA_1 by using the bit information BIT_INFO being one or more data bits corresponding to a position of a preset bit of the data bits constituting the logical page number LPN. The controller 100 may generate bit data for accessing sub-components of memory devices of the nonvolatile memory device 200 allocated to a virtual group, so as to be stored as the first physical address PA_1.

Accordingly, information for distinguishing the virtual groups of the nonvolatile memory device 200 from each other may be omitted from and not stored in the mapping table MAP_TAB. That is, the second physical address PA_2 being a physical address stored in the mapping table MAP_TAB may not include information for distinguishing virtual groups. Accordingly, in the memory 300, the size of a space in which the mapping table MAP_TAB is stored may be reduced.

Figure 2:
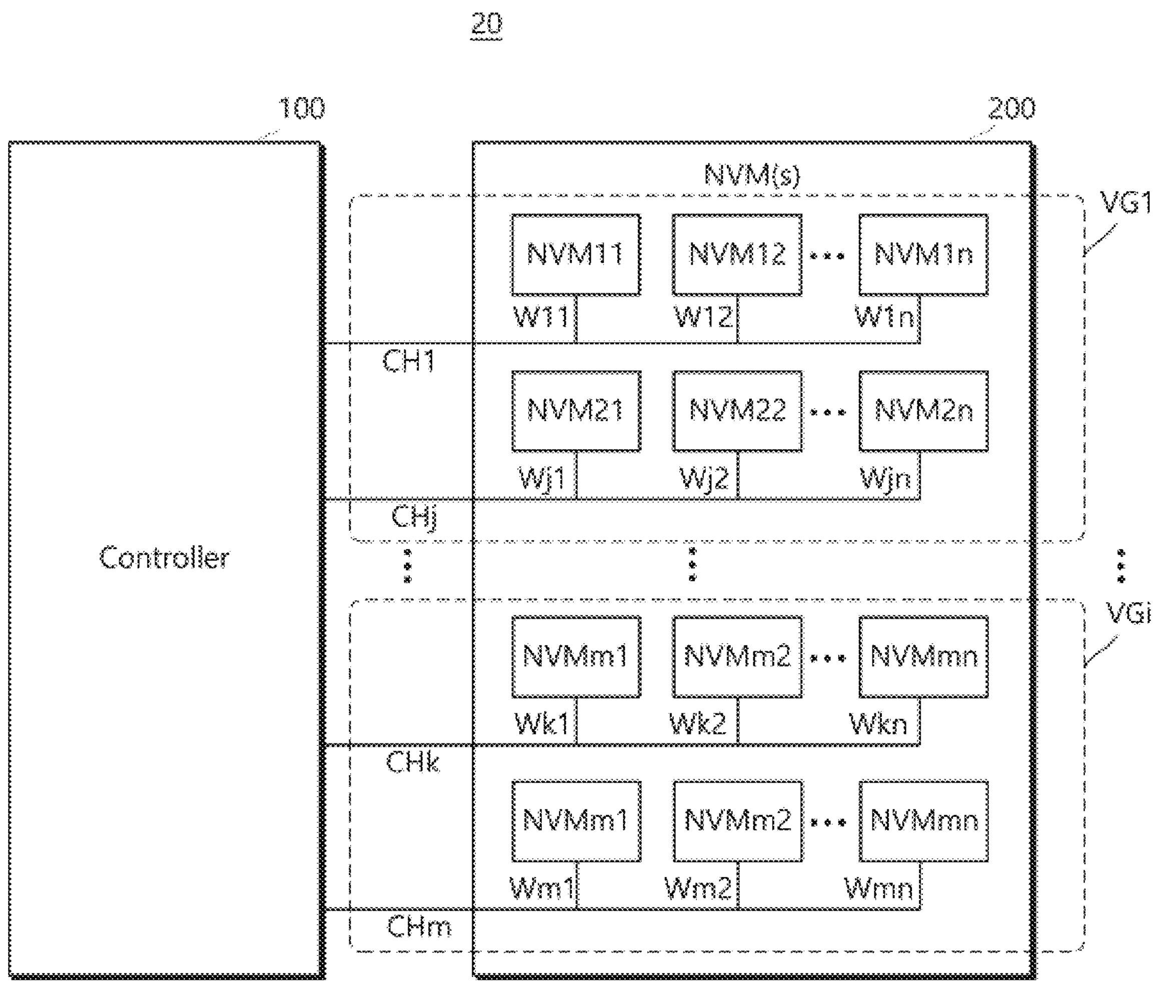
FIG. 2 is a diagram describing a storage device according to an embodiment.

FIG. 2 is a block diagram illustrating a storage device according to an embodiment. The storage device 20 of FIG. 2 may correspond to the storage device 20 of FIG. 1.

Referring to FIG. 2, the nonvolatile memory device (NVM) 200 may be connected to the controller 100 through a plurality of channels CH1, CHj, . . . , CHk, and CHm.

The controller 100 may perform a data input/output operation and/or an erase operation on a plurality of non-volatile memory devices NVM11 to NVMmn through the plurality of channels CH1, CHj, . . . , CHk, and CHm.

The controller 100 may control nonvolatile memory devices 200 connected to one of the plurality of channels CH1, CHj, . . . , CHk, and CHm through a way. For example, the controller 100 may control the nonvolatile memory devices NVM11, NVM12, . . . , NVM1*n* connected to the first channel CH1 through ways W11, W12, . . . , W1*n*, respectively.

The controller 100 may exchange signals with the non-volatile memory device 200 through the plurality of channels CH1, CHj, . . . , CHk, and CHm. For example, through the plurality of channels CH1, CHj, . . . , CHk, and CHm, the controller 100 may transmit commands, addresses, and/or data to the nonvolatile memory device 200 and/or may receive data from the nonvolatile memory device 200.

In an embodiment, the storage device 20 may include a plurality of flash controllers (not illustrated) which are respectively allocated to the plurality of channels CH1, CHj, . . . , CHk, and CHm or are allocated to a plurality of groups. In this case, in response to an input/output request for data received from the controller 100, each flash controller may write data in an allocated nonvolatile memory device or may read data from the nonvolatile memory device so as to be transmitted to the controller 100. Depending on a structure of the storage device 20, at least one nonvolatile memory package, at least one memory die, and/or at least one plane may be allocated at least for each flash controller. In some embodiments, some functions or operations which are described as being performed by the controller 100 may be performed by a flash controller, or a configuration of the controller 100 may be a configuration of the flash controller.

The nonvolatile memory device (NVM) 200 may include the plurality of nonvolatile memory devices NVM11 to NVMmn. Each of the nonvolatile memory devices NVM11 to NVMmn may be a nonvolatile memory package, a memory die, a plane, and/or a block. In an embodiment, when each of the nonvolatile memory devices NVM11 to NVMmn is a nonvolatile memory package, each of the nonvolatile memory packages may include a plurality of dies. However, embodiments are not limited thereto.

The controller 100 may simultaneously control at least some of ways connected to the plurality of channels CH1, CHj, . . . , CHk, and CHm and/or ways connected to the same channel from among the plurality of ways W11, W12, . . . , Win and may process data input/output operations in parallel. For example, the controller 100 may stripe the data input/output operations on the plurality of channels CH1, CHj, . . . , CHk, and CHm.

The controller 100 according to an embodiment may classify the plurality of nonvolatile memory devices NVM11 to NVMmn into a plurality of virtual groups VG1 to VGi. That is, the storage device 20 may divide a nonvolatile memory package, a memory die, a plane, and/or a block into the plurality of virtual groups VG1 to VGi.

Referring to FIG. 2, the controller 100 may divide the nonvolatile memory device 200 into the plurality of virtual groups VG1, . . . , VGi. However, as will be described in various embodiments, the present disclosure does not exclude an embodiment in which the controller 100 classifies the plurality of nonvolatile memory devices NVM11 to NVMmn into the plurality of virtual groups VG1, . . . , VGi based on ways connected to each channel or other sub-components of the nonvolatile memory device 200.

The controller 100 may perform the data input/output operation by accessing the plurality of nonvolatile memory devices NVM11 to NVMmn allocated to the plurality of virtual groups VG1, . . . , VGi based on the first physical address PA_1 of FIG. 1. In this case, the controller 100 may access the plurality of nonvolatile memory devices NVM11 to NVMmn based on information of the first physical address PA_1, which is used to distinguish the plurality of virtual groups VG1, . . . , VGi. The information of the first physical address PA_1, which is used to distinguish the plurality of virtual groups VG1, . . . , VGi, may be information generated by the controller 100 based on a logical address provided from the host 10.

In an embodiment, when the storage device 20 includes a plurality of flash controllers respectively allocated to the plurality of channels CH1, CHj, . . . , CHk, and CHm or allocated to a plurality of groups, the storage device 20 may allocate the data input/output operation to one of the plurality of flash controllers based on the information for distinguishing the plurality of virtual groups VG1, . . . , VGi. For example, the data input/output operation may be allocated to one of the plurality of flash controllers based on the bit information BIT_INFO of FIG. 1.

Figure 3:
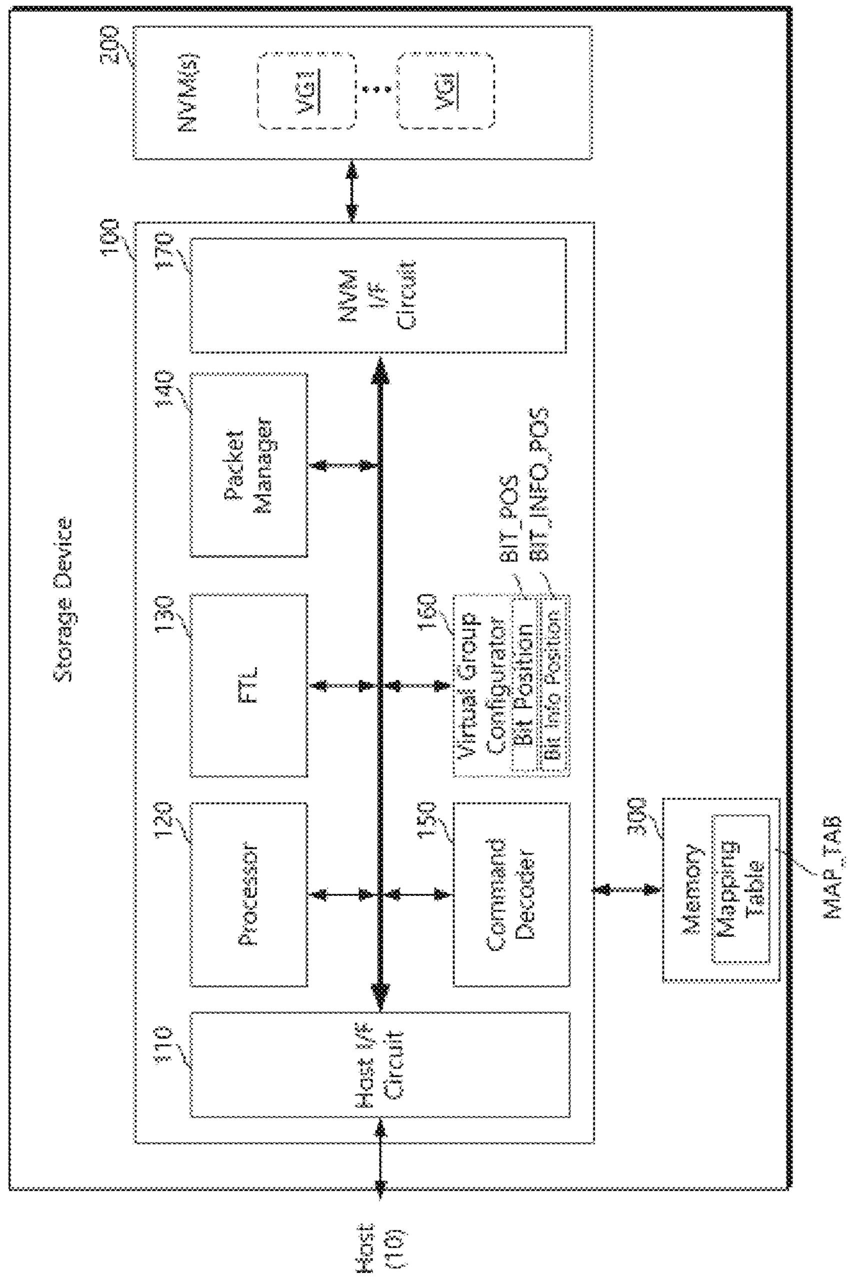
FIG. 3 is a block diagram illustrating a configuration of a storage device according to an embodiment.

FIG. 3 is a block diagram illustrating a configuration of a storage device according to an embodiment. The storage device 20 according to the embodiment of FIG. 3 may correspond to the storage device 20 of FIGS. 1 and 2.

The storage device 20 may include the controller 100, at least one nonvolatile memory device (NVM) 200, and the memory 300.

The controller 100 according to an embodiment may include a host interface (I/F) circuit 110, a processor 120, a flash translation layer (FTL) 130, a packet manager 140, a command decoder 150, and a nonvolatile memory (NVM) interface (I/F) circuit 170. In some embodiments, the controller 100 may include a virtual group configurator 160.

The controller 100 may communicate with the host 10 through the host interface (I/F) circuit 110. The host interface circuit 110 may be implemented with various interfaces such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an IEEE 1394 interface, a universal serial bus (USB) interface, a non-volatile memory express (NVMe) interface, and/or a computer express link (CXL) interface.

The processor 120 may load firmware of the storage device 20 into a working memory of the memory 300 and access the working memory and execute the firmware to cause the processor 120 to perform an overall operation of the controller 100. The processor 120 may load the mapping table MAP_TAB to the working memory. In an embodiment, the processor 120 may determine the logical page number LPN based on the logical block address LBA provided from the host interface circuit 110. In some embodiments, the host interface circuit 110 may determine the logical page number LPN and may provide the logical page number LPN to the processor 120 and/or the flash translation layer 130.

The flash translation layer (FTL) 130 may perform various operations such as an address mapping operation, a wear-leveling operation, and/or a garbage collection operation.

The address mapping operation refers to an operation of translating a logical address received from the host 10 into a physical address to be used to actually program data in the nonvolatile memory device 200. For example, the logical block address LBA of user data which are requested by the host 10 to be programmed may be translated into a physical address of the nonvolatile memory device 200 by the flash translation layer 130 through the logical page number LPN. In an embodiment, the physical address may be the first physical address PA_1 described with reference to FIG. 1. In an embodiment, the mapping table MAP_TAB which the flash translation layer 130 manages may store information about the correlation between the logical page number LPN and the second physical address PA_2 described with reference to FIG. 2. Each of the logical page numbers LPN may correspond to a plurality of logical block addresses LBA.

The flash translation layer (FTL) 130 may perform the wear-leveling by balancing erase counts of physical blocks. According to the wear-leveling, blocks of the nonvolatile memory device 200 may be uniformly used, and thus, a specific block may be prevented from excessively deteriorating. The flash translation layer 130 may perform the garbage collection for securing an available capacity of the nonvolatile memory device 200 by copying valid data of an existing block to a new block and erasing the existing block.

The packet manager 140 may generate a packet complying with an interface protocol negotiated with the host 10 or may parse various kinds of information from the packet received from the host 10.

The command decoder 150 may decode the command parsed from the packet based on a protocol of an interface negotiated with the host 10. For example, the processor 120 may decode an opcode of a command which is based on the NVMe protocol and may distinguish a write command, a read command, and/or a flush command. The processor 120 may perform a workload requested by the host 10 depending on the decoded commands.

The memory 300 may include registers for storing internal variables of the controller 100. In an embodiment, a portion of the memory 300 may be used as a buffer memory and may temporarily store data to be recorded at the nonvolatile memory device 200 or data read from the nonvolatile memory device 200. FIG. 3 shows an example where the memory 300 is located outside the controller 100, but embodiments are not limited thereto and, in some embodiments, the memory 300 may be disposed inside and/or outside the controller 100. In some embodiments, when the host buffer memory is provided by the host 10, the memory 300 may not operate as a buffer memory.

The nonvolatile memory device (NVM) 200 according to an embodiment may be divided into the plurality of virtual groups VG1 to VGi.

The flash translation layer (FTL) 130 may distinguish the virtual groups VG1 to VGi of the nonvolatile memory device 200 and memory devices (e.g., memory packages, memory dies, planes, and/or blocks) allocated to each of the virtual groups VG1 to VGi based on the first physical address PA_1 of FIG. 1 and may perform the data input/output operations on the virtual groups VG1 to VGi of the nonvolatile memory device 200 through the nonvolatile memory (NVM) interface (I/F) circuit 170. That is, based on the first physical address PA_1, the flash translation layer 130 may write data in sub-memory components allocated to the virtual groups VG1 to VGi of the nonvolatile memory device 200 and/or may read data from the sub-memory components allocated to the virtual groups VG1 to VGi.

The flash translation layer (FTL) 130 may translate the logical page number LPN into the second physical address PA_2 of FIG. 1 based on the mapping table MAP_TAB and may generate the first physical address PA_1 by using some data bits of the logical page number LPN and the second physical address PA_2.

The flash translation layer (FTL) 130 may generate bit information for distinguishing the virtual groups VG1 to VGi by using bit data of bits of the logical page number LPN, whose positions are determined in advance, and may store the generated bit information as the first physical address PA_1. According to embodiments, the bit data may be converted into bit information by a preset rule or may be generated as bit information without modification. The following embodiments will be described under the assumption that bit data of bits of the logical page number LPN, whose positions are determined in advance, are generated as bit information without modification.

Bit data which the flash translation layer 130 uses to generate the bit information may include bits of the logical page number LPN, whose bit positions are determined in advance. Bit data may vary depending on the number of virtual groups VG1 to VGi. For example, when the nonvolatile memory device 200 is managed by using two virtual groups, one bit corresponding to the preset bit position from among the bits of the logical page number LPN may be used as bit information. When the nonvolatile memory device 200 is managed by using four virtual groups, two bits among the bits of the logical page number LPN may be used as bit information, and so on.

In an embodiment, in the logical page number LPN, the preset bit position may be determined by logic of the flash translation layer 130. That is, according to a circuit configuration of the flash translation layer 130, bit data corresponding to the preset bit position(s) may be read from storage elements (e.g., flip-flops or registers), to which the logical page number LPN is loaded, through a preset signal line(s), and the read bit data may be used as the bit information. The logic of the flash translation layer 130 may be a hardware circuit or firmware.

In some embodiments, in the logical page number LPN, the preset bit position may be stored as bit position information BIT_POS. The bit position information BIT_POS may be accessed by the virtual group configurator 160. For example, the bit position information BIT_POS may be stored in a register which is capable of being accessed by the virtual group configurator 160. According to embodiments, the bit position information BIT_POS may be stored in the process of shipping the storage device 20 or may be stored in the process of resetting the storage device 20 after shipping. The present disclosure does not specifically limit a time when the bit position information BIT_POS is stored.

In an embodiment, the flash translation layer 130 and/or the virtual group configurator 160 may store a criterion for distinguishing the virtual groups VG1 to VGi. The criterion for distinguishing the virtual groups VG1 to VGi may be implemented with a hardware circuit of the flash translation layer 130 and/or the virtual group configurator 160, may be implemented by a firmware operation, and/or may be stored as data in a memory device. For example, in an embodiment, the criterion for distinguishing the virtual groups VG1 to VGi may refer to distinguishing the virtual groups VG1 to VGi based on the plurality of channels CH1, CHj, . . . , CHk, and CHm, as described with reference to FIG. 2. In some embodiments, the criterion for distinguishing the virtual groups VG1 to VGi may be ways and/or any other sub-components of the nonvolatile memory device 200.

In an embodiment, the flash translation layer 130 and/or the virtual group configurator 160 may store a bit information insertion position BIT_INFO_POS of the first physical address PA_1, at which the bit information BIT_INFO is inserted. The flash translation layer 130 may insert the bit information BIT_INFO at a bit position of the first physical address PA_1, which corresponds to the bit information insertion position BIT_INFO_POS. For example, when the virtual groups VG1 to VGi are distinguished based on the plurality of channels CH1, CHj, . . . , CHk, and CHm, the flash translation layer 130 may insert the bit information BIT_INFO at least significant bits (LSBs) of bit positions corresponding to a channel address in the first physical address PA_1, based on the bit information insertion position BIT_INFO_POS.

The bit information insertion position BIT_INFO_POS may be implemented with a hardware circuit of the flash translation layer 130 and/or the virtual group configurator 160, may be implemented by a firmware operation, and/or may be stored as data in a memory device.

Figure 4:
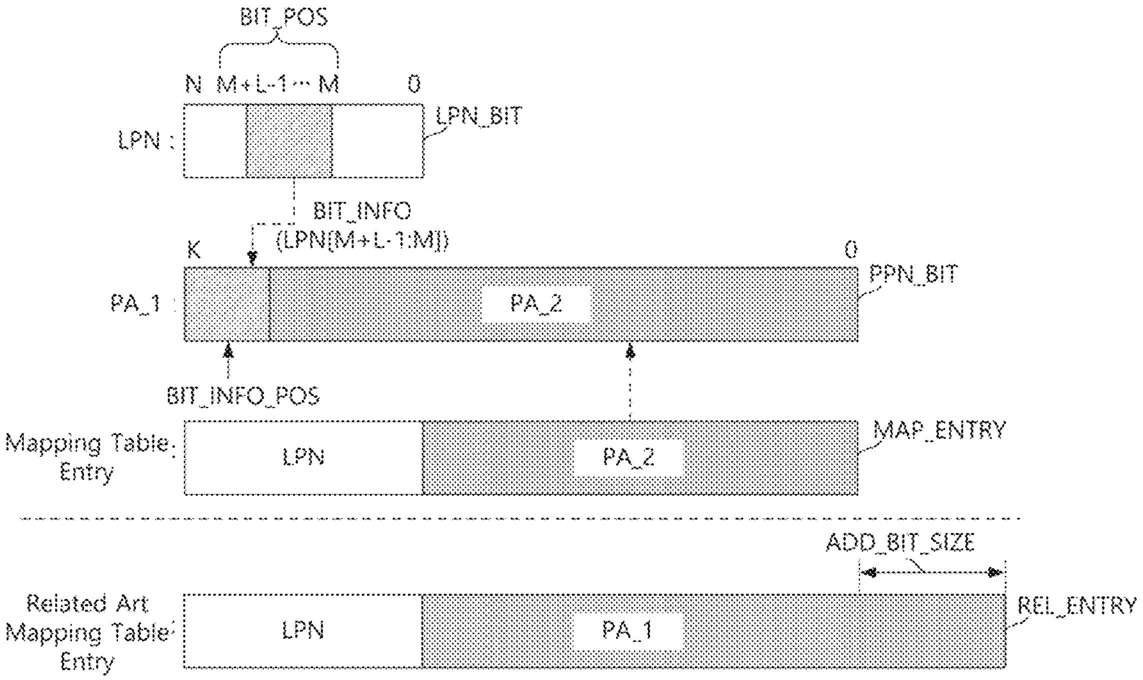
FIG. 4 is a diagram describing a mapping entry of a logical address-physical address mapping table according to an embodiment.

FIG. 4 is a diagram describing the first physical address PA_1 and a mapping entry MAP_ENTRY of the mapping table MAP_TAB storing information about a correlation of a logical address and a physical address, according to an embodiment. How the flash translation layer 130 of FIG. 3 generates the first physical address PA_1 of FIG. 1 based on the mapping entry MAP_ENTRY of the mapping table MAP_TAB will be described with reference to FIGS. 1, 3, and 4.

Referring to FIG. 4, the flash translation layer 130 according to an embodiment may check the second physical address PA_2 corresponding to the logical page number LPN provided from the host interface circuit 110 or from the processor 120, based on the mapping table MAP_TAB. The second physical address PA_2 may not include information for distinguishing virtual groups of the nonvolatile memory device 200.

The flash translation layer 130 may search the mapping table MAP_TAB, in which a plurality of mapping entries are stored, for the mapping entry MAP_ENTRY in which the provided logical page number LPN is included. The flash translation layer 130 may store the second physical address PA_2 stored in the found mapping entry MAP_ENTRY as a portion of bit data PPN_BIT constituting the first physical address PA_1.

The flash translation layer 130 may extract the bit information BIT_INFO, which is includes bit data corresponding to a preset position, from bit data LPN_BIT constituting the provided logical page number LPN by referring to the bit position information BIT_POS and may store the extracted bit information BIT_INFO as a portion of the bit data PPN_BIT constituting the first physical address PA_1. The referring to the bit position information BIT_POS may be made by the logic of the flash translation layer 130 and/or may mean referring to a bit position which the virtual group configurator 160 of FIG. 3 provides. For example, referring to FIG. 4, the flash translation layer 130 may extract the bit information BIT_INFO of "L" bits from bit positions [M+L−1:M] of the bit data LPN_BIT constituting the logical page number LPN, by referring to the bit position information BIT_POS. A least significant bit (LSB) position [M] among the bit positions [M+L−1:M] of the bit data LPN_BIT constituting the logical page number LPN is not specifically limited to any one of bits constituting the bit data LPN_BIT. That is, the least significant bit (LSB) position [M] may be arbitrarily set in advance. The number of bits extracted from the bit data LPN_BIT constituting the logical page number LPN, as denoted as "L", may be based on the number of virtual groups used to manage the nonvolatile memory device 200. For example, when "i" virtual groups are used, the number of virtual groups, as denoted as "i", and the number of extracted from the bit data LPN_BIT, as denoted as "L", may have a relationship of $i=2^L$.

The flash translation layer 130 may store the extracted bit information BIT_INFO as a portion of the bit data PPN_BIT constituting the first physical address PA_1, by referring to the bit information insertion position BIT_INFO_POS. The referring to the bit information insertion position BIT_INFO_POS may be made by the logic of the flash translation layer 130 and/or may mean referring to a bit information insertion position which the virtual group configurator 160 of FIG. 3 provides. The bit information insertion position BIT_INFO_POS may be based on the criterion for distinguishing virtual groups. The bit information insertion position BIT_INFO_POS will be described in detail with reference to FIGS. 10 to 17.

Referring to FIG. 4, a data size of the mapping entry MAP_ENTRY stored in the mapping table MAP_TAB according to an embodiment may be different from a data size of a mapping entry REL_ENTRY stored in a mapping table according to the related art. For example, the size of the mapping entry MAP_ENTRY according to an embodiment may be smaller than the size of the mapping entry REL_ENTRY according to the related art as much as a specific size ADD_BIT_SIZE. The reason is that the mapping entry MAP_ENTRY according to an embodiment does not store the bit information BIT_INFO being information for distinguishing virtual groups. Accordingly, in the memory 300 of FIG. 3, the size of a space where the mapping table MAP_TAB is stored may be reduced.

Figure 5:
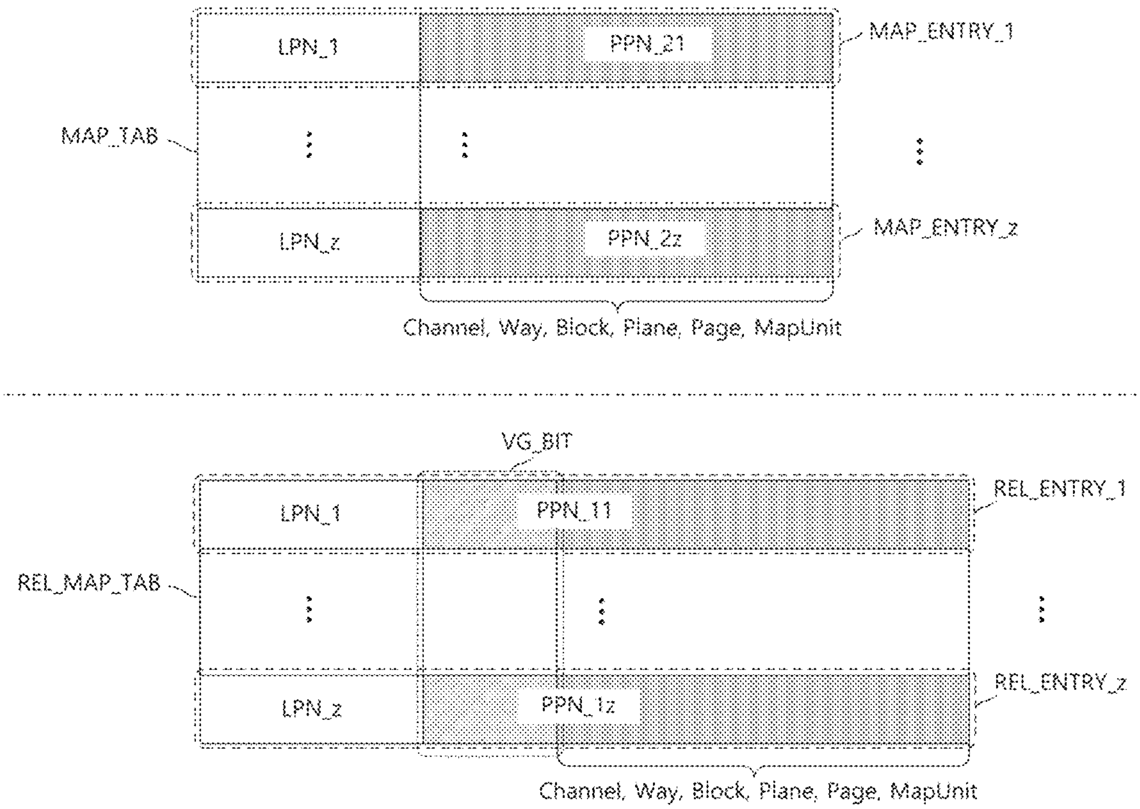
FIG. 5 is a diagram describing a logical address-physical address mapping table according to an embodiment.

FIG. 5 is a diagram describing a mapping table according to an embodiment. FIG. 5 shows the mapping table MAP_TAB according to an embodiment and a mapping table REL_MAP_TAB according to the related art. The mapping tables MAP_TAB and REL_MAP_TAB may store information about a correlation of logical addresses and physical addresses of nonvolatile memory devices managed by using a plurality of virtual groups.

Referring to FIG. 5, each of the mapping table MAP_TAB according to an embodiment and the mapping table REL_MAP_TAB according to the related art includes a plurality of mapping entries. That is, the mapping table MAP_TAB according to an embodiment includes mapping entries MAP_ENTRY_1 to MAP_ENTRY_z, and the mapping table REL_MAP_TAB according to the related art includes mapping entries REL_ENTRY_1 to REL_ENTRY_Z.

Each of the mapping entries MAP_ENTRY_1 to MAP_ENTRY_z of the mapping table MAP_TAB according to an embodiment may include one of logical page numbers LPN_1 to LPN_z and may include one of second physical addresses PPN_21 to PPN_2*z* corresponding to a logical page number. The second physical addresses PPN_21 to PPN_2*z* of the mapping entries MAP_ENTRY_1 to MAP_ENTRY_z do not store bit data VG_BIT for distinguishing a plurality of virtual groups of a nonvolatile memory device. Each of the second physical addresses PPN_21 to PPN_2*z* may include a physical address of a channel, a way, a block, a plane, a page, and/or a mapping unit MapUnit of the nonvolatile memory device 200. The mapping unit MapUnit may refer to a unit structure in which the input/output operation of the nonvolatile memory device 200 is performed.

Each of the mapping entries REL_ENTRY_1 to REL_ENTRY_z of the mapping table REL_MAP_TAB according to the related art may include one of the logical page numbers LPN_1 to LPN_z and may include one of physical addresses PPN_11 to PPN_1*z* corresponding to a logical page number. Unlike the embodiment of the present disclosure, each of the physical addresses PPN_11 to PPN_1*z* of the mapping entries REL_ENTRY_1 to REL_ENTRY_z according to the related art stores the bit data VG_BIT for distinguishing a plurality of virtual groups of a nonvolatile memory device. Also, each of the physical addresses PPN_11 to PPN_1*z* may include a physical address of a channel, a way, a block, a plane, a page, and/or the mapping unit MapUnit of the nonvolatile memory device 200.

Accordingly, the mapping table MAP_TAB according to an embodiment may reduce a storage space in which the bit data VG_BIT for distinguishing a plurality of virtual groups are stored, in the plurality of mapping entries MAP_ENTRY_1 to MAP_ENTRY_Z. As the number of virtual groups and the number of mapping entries MAP_ENTRY_1 to MAP_ENTRY_z increase, the total storage space reduced may increase. The total storage space reduced may be as large as tens of megabytes to hundreds of megabytes, and thus, a storage space of a volatile memory device, in which the mapping table MAP_TAB is temporarily stored may be saved.

Figure 6:
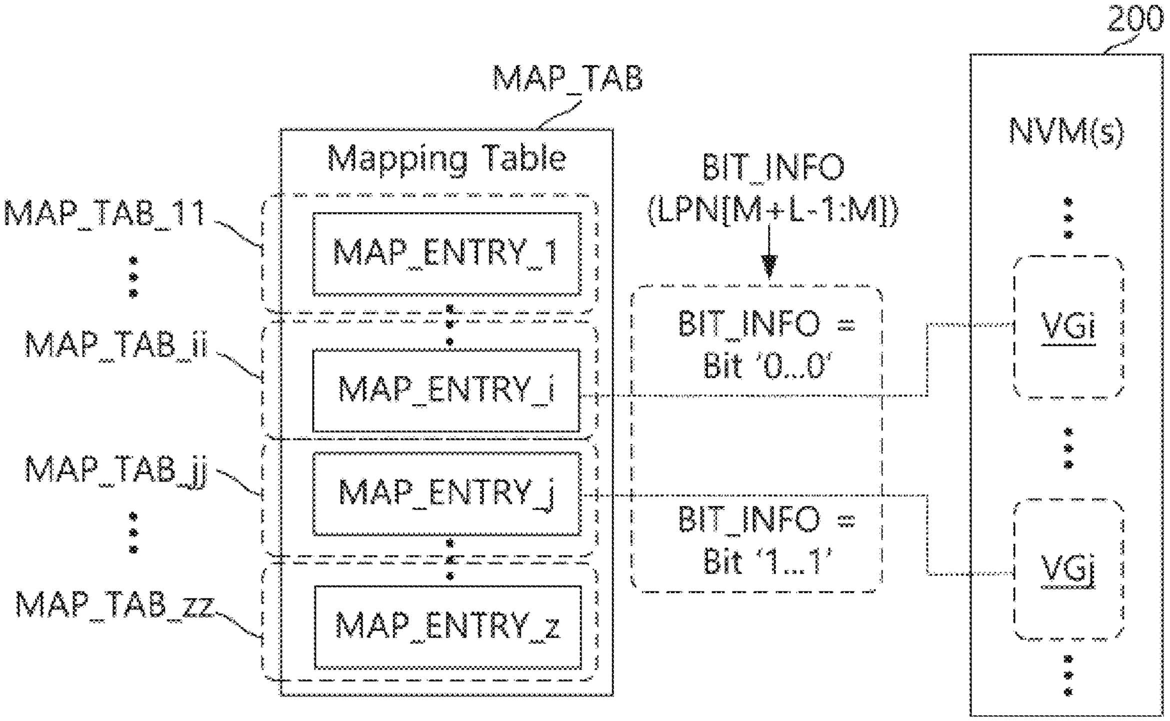
FIG. 6 is a diagram describing a relationship between a logical address-physical address mapping table and a plurality of virtual groups, according to an embodiment.

FIG. 6 is a diagram describing a relationship between a mapping table and a plurality of virtual groups of a nonvolatile memory device, according to an embodiment. The mapping table MAP_TAB of FIG. 6 may correspond to the mapping table MAP_TAB of FIGS. 1 to 5. The nonvolatile memory device (NVM) 200 of FIG. 6 may correspond to the nonvolatile memory device (NVM) 200 of FIGS. 1 to 5.

Referring to FIG. 6, each of the plurality of mapping entries MAP_ENTRY_1 to MAP_ENTRY_z of the mapping table MAP_TAB according to an embodiment may correspond to a logical page number and a physical address included in one of a plurality of virtual groups of the nonvolatile memory device 200. However, each of the plurality of mapping entries MAP_ENTRY_1 to MAP_ENTRY_z does not store the bit information BIT_INFO for distinguishing the plurality of virtual groups.

The controller 100 may generate the bit information BIT_INFO for distinguishing a plurality of virtual groups based on logical addresses and may generate the first physical address PA_1 in which the generated bit information BIT_INFO is combined with at least a part of one of the plurality of mapping entries MAP_ENTRY_1 to MAP_ENTRY_z. Even though the storage capacity for storing the mapping table MAP_TAB decreases, the controller 100 may distinguish the plurality of virtual groups based on the first physical address PA_1 in which the bit information BIT_INFO for distinguishing the plurality of virtual groups is included and may efficiently perform the workload associated with the plurality of virtual groups.

In an embodiment, the plurality of mapping entries MAP_ENTRY_1 to MAP_ENTRY_z may respectively correspond to a plurality of virtual group mapping tables MAP_TAB_11, . . . , MAP_TAB_zz. In an embodiment, the plurality of virtual group mapping tables MAP_TAB_11, . . . , MAP_TAB_zz may be respectively stored in similar memory regions of the memory 300. For example, one virtual group mapping table MAP_TAB_11 may be stored in a first region of the memory 300, and another virtual group mapping table MAP_TAB_ii may be stored in a second region. In this case, the controller 100 may search for a memory region of the memory 300 corresponding to the bit information BIT_INFO.

Figure 7:
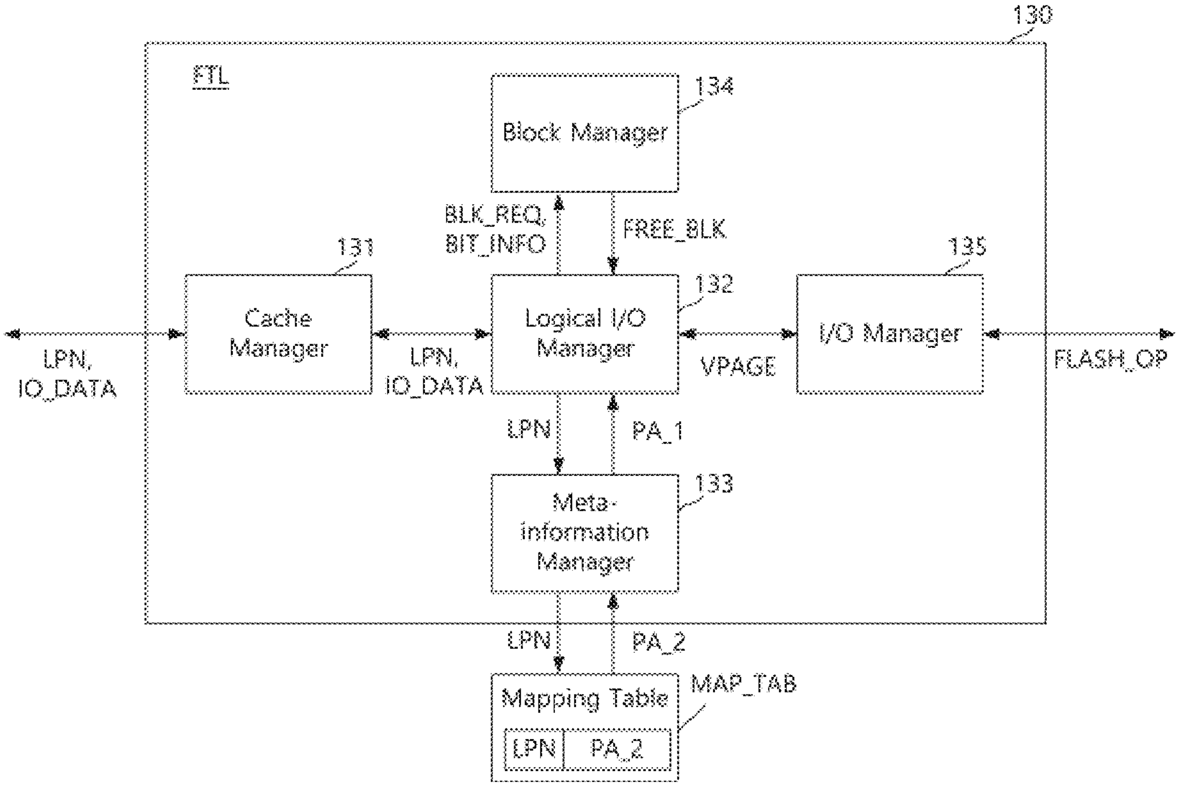
FIG. 7 is a diagram describing a flash translation layer of a storage device according to an embodiment.

FIG. 7 is a diagram describing a flash translation layer (FTL) of a storage device according to an embodiment. The flash translation layer 130 may correspond to the flash translation layer 130 of FIG. 3. The flash translation layer 130 will be described with reference to FIGS. 1 to 6 and 7.

Referring to FIG. 7, the flash translation layer 130 according to an embodiment may include a cache manager 131, a logical input/output (I/O) manager 132, a meta information manager 133, a block manager 134, and an input/output (I/O) manager 135. Each component (i.e., each manager) may be implemented with hardware logic or firmware.

In an embodiment, the cache manager 131 may receive the logical page number LPN and/or the input/output data IO_DATA. In some embodiments, the input/output data IO_DATA may not be received. The cache manager 131 may process a data hazard. For example, when a plurality of input/output operations on the same logical page number LPN are received at different times, the cache manager 131 may control the execution of the plurality of input/output operations.

The logical input/output (I/O) manager 132 may include a logical input manager and a logical output manager. When there is no free block FREE_BLK to write data, the logical input manager may provide a free block request BLK_REQ and the bit information BIT_INFO to the block manager 134 and may receive the free block FREE_BLK from the block manager 134 in response thereto. When the nonvolatile memory device 200 of FIG. 1 is managed by using a plurality of virtual groups, the bit information BIT_INFO may be information corresponding to one of the plurality of virtual groups. That is, the bit information BIT_INFO may be information for distinguishing the plurality of virtual groups. The block manager 134 may provide the logical input manager with the free block FREE_BLK included in the virtual group corresponding to the bit information BIT_INFO.

The logical input/output (I/O) manager 132 may provide the received logical page number LPN to the meta information manager 133 and may receive the first physical address PA_1 corresponding to the logical page number LPN from the meta information manager 133. In an embodiment, the logical I/O manager 132 may temporarily store information about the plurality of input/output operations in a buffer memory. When the size of the plurality of input/output operations whose information is temporarily stored in the buffer memory satisfies a threshold size or a number of input/output operations whose information is temporarily stored in the buffer memory satisfies a threshold value, the logical I/O manager 132 may request the I/O manager 135 to perform the plurality of input/output operations. The threshold size may be present and the threshold value may be preset. In an example, the logical I/O manager 132 may temporarily store a plurality of write workloads associated with the nonvolatile memory device 200, may convert the plurality of write workloads in a specific form VPAGE, and may request the I/O manager 135 to perform a workload.

The input/output (I/O) manager 135 may partially process at least one input/output operation in parallel. The I/O manager 135 may convert input/output data in a form FLASH_OP appropriate for the write operation of the nonvolatile memory device 200 so as to be written in the nonvolatile memory device 200 or may read output data from the nonvolatile memory device 200.

The meta information manager 133 according to an embodiment may manage the mapping table MAP_TAB. The meta information manager 133 may extract the second physical address PA_2 of a mapping entry corresponding to the received logical page number LPN from the mapping table MAP_TAB. The meta information manager 133 may determine the bit information BIT_INFO based on the received logical page number LPN and may generate the first physical address PA_1 based on the second physical address PA_2 and the bit information BIT_INFO. The meta information manager 133 may provide the logical I/O manager 132 with the first physical address PA_1 thus generated.

Figure 8:
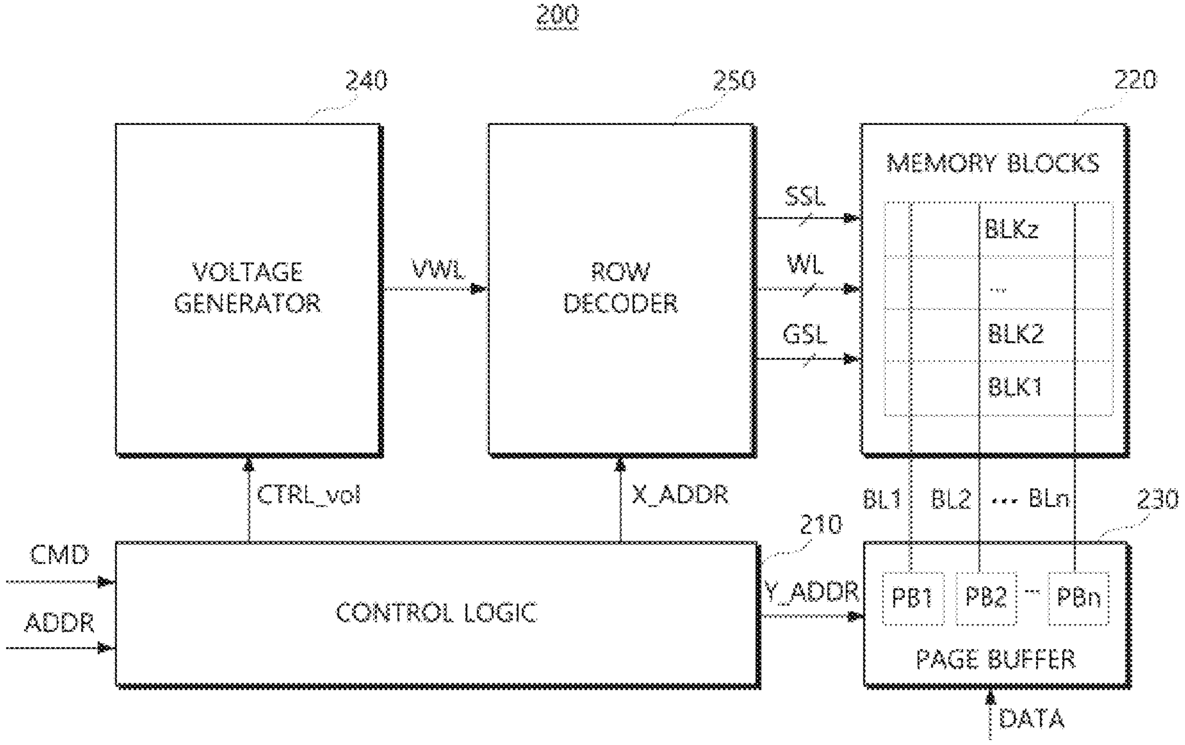
FIG. 8 is a diagram illustrating a configuration of a memory device of a storage device according to an embodiment.

FIG. 8 is a diagram illustrating a configuration of a nonvolatile memory device (NVM) of a storage device according to an embodiment. The nonvolatile memory device (NVM) 200 according to an embodiment of FIG. 8 may correspond to the nonvolatile memory device (NVM) 200 of FIGS. 1, 2, 3, and 6.

Referring to FIG. 8, in an embodiment, the nonvolatile memory device (NVM) 200 may include a control logic circuit 210, memory blocks 220, a page buffer 230, a voltage generator 240, and a row decoder 250. Although not illustrated in FIG. 8, in some embodiments, the nonvolatile memory device 200 may further include additional components of a memory device of a solid state drive, such as a memory interface circuit, a column logic, a pre-decoder, a temperature sensor, a command decoder, and/or an address decoder.

The control logic circuit 210 may overall control various kinds of operations of the nonvolatile memory device 200. The control logic circuit 210 may output various kinds of control signals in response to a command CMD and/or a physical address ADDR from the memory interface circuit. For example, the control signals may include a voltage control signal CTRL_vol, a row address X_ADDR, and a column address Y_ADDR.

The memory blocks 220 may include a plurality of memory blocks BLK1 to BLKz (z being a positive integer), and each of the plurality of memory blocks BLK1 to BLKz may include a plurality of memory cells. The memory blocks 220 may be connected to the page buffer 230 through bit lines BL1 to BLn and may be connected to the row decoder 250 through word lines WL, string selection lines SSL, and ground selection lines GSL.

The page buffer 230 may include a plurality of page buffers PB1 to PBn (n being an integer of 3 or more), and the plurality of page buffers PB1 to PBn may be respectively connected to memory cells included in each of the plurality of memory blocks BLK1 to BLKz through the plurality of bit lines BL1 to BLn. The page buffer 230 may select at least one of the bit line BL1 to BLn in response to the column address Y_ADDR. The page buffer 230 may operate as a write driver or a sense amplifiers depending on an operation mode. For example, in the program operation, the page buffer 230 may apply a bit line voltage corresponding to data to be programmed to the selected bit line. In the read operation, the page buffer 230 may sense a current or a voltage of the selected bit line to read data stored in a memory cell.

The voltage generator 240 may generate various kinds of voltages for performing the program, read, and erase operations based on the voltage control signal CTRL_vol.

In response to the row address X_ADDR, the row decoder 250 may select one of the plurality of word lines WL and may select one of the plurality of string selection lines SSL.

The memory blocks 220 according to an embodiment may be classified into a plurality of virtual groups. In an embodiment, the physical address ADDR which the control logic circuit 210 receives may include information for distinguishing the plurality of virtual groups.

Figure 9:
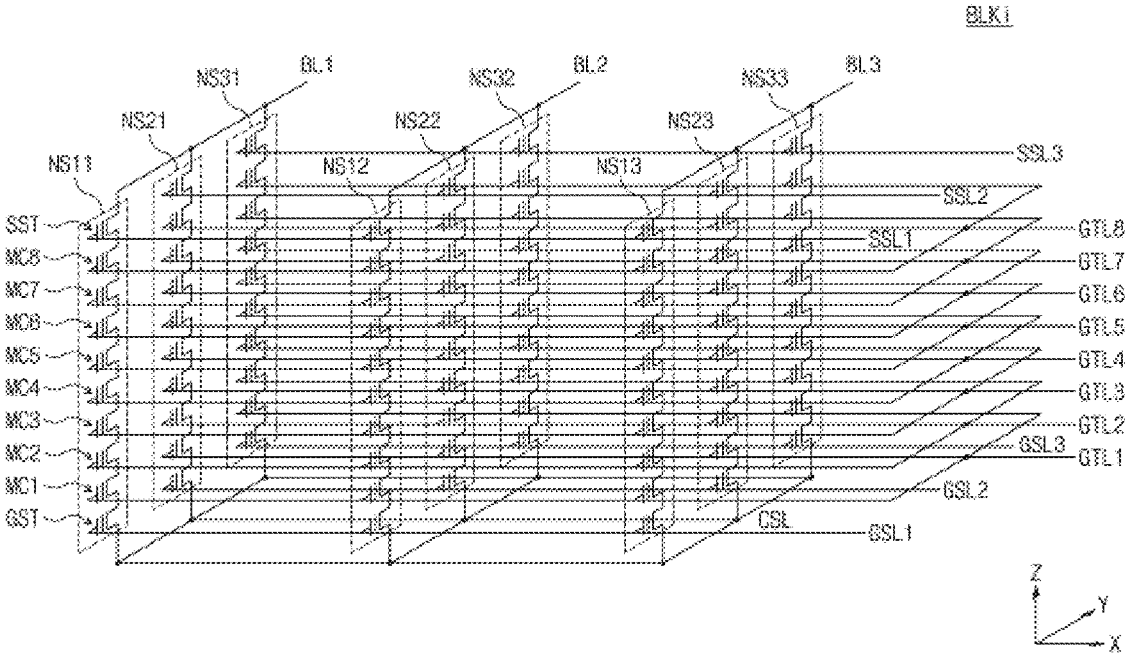
FIG. 9 is a diagram illustrating memory blocks of a storage device according to an embodiment in detail.

FIG. 9 is a diagram illustrating a memory block of a three-dimensional NAND (VNAND) structure applicable to a storage device according to an embodiment. In FIG. 9, a memory block BLKi may correspond to one of the memory blocks BLK1 to BLKz of FIG. 8. When a nonvolatile memory of a storage device is implemented with a 3D V-NAND-type flash memory, each of a plurality of memory blocks constituting the nonvolatile memory may be expressed by an equivalent circuit illustrated in FIG. 9.

The memory block BLKi illustrated in FIG. 9 indicates a three-dimensional memory block formed on a substrate in a three-dimensional structure. For example, a plurality of memory NAND strings included in the memory block BLKi may be formed in a direction perpendicular to the substrate.

Referring to FIG. 9, the memory block BLKi may include a plurality of memory NAND strings NS11 to NS33 connected between the bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. An embodiment in which each of the plurality of memory NAND strings NS11 to NS33 includes 8 memory cells MC1, MC2, . . . , MC8 is illustrated in FIG. 9, but embodiments are not limited thereto.

The string selection transistor SST may be connected to a corresponding one of string selection lines SSL1, SSL2, and SSL3. The plurality of memory cells MC1, MC2, . . . , MC8 may be respectively connected to gate lines GTL1, GTL2, . . . , GTL8. The gate lines GTL1, GTL2, . . . , GTL8 may correspond to word lines, and in an embodiment, at least one of the gate lines GTL1, GTL2, . . . , GTL8 may correspond to a dummy word line. The ground selection transistor GST may be connected to a corresponding one of ground selection lines GSL1, GSL2, and GSL3. The string selection transistor SST is connected to a corresponding bit line among the bit lines BL1, BL2, and BL3, and the ground selection transistor GST is connected to the common source line CSL.

Word lines (e.g., WL1) at the same height may be connected in common, and the ground selection lines GSL1, GSL2, and GSL3 and the string selection lines SSL1, SSL2, and SSL3 may be separated from each other. An embodiment in which the memory block BLKi is connected to 8 gate lines GTL1, GTL2, . . . , GTL8 and 3 bit lines BL1, BL2, and BL3 is illustrated in FIG. 9, but embodiments are not limited thereto.

The bit density of the memory block BLKi may vary depending on the number of bits which each of the memory cells included in the memory block BLKi stores.

FIGS. 10 to 17 are diagrams describing structures of mapping entries and management structures based on virtual groups corresponding to each mapping entry, according to some embodiments.

Virtual groups of FIGS. 10 to 17 may be managed on the nonvolatile memory device (NVM) 200 by the controller 100 of FIGS. 1, 2, and 3. Nonvolatile memory devices NVM11, . . . , NVM88 correspond to memory devices of the nonvolatile memory device (NVM) 200 of FIGS. 1, 2, 3, and 6. Embodiments will be described with reference to FIGS. 10 to 17 under the assumption that the nonvolatile memory device 200 is connected to 8 channels and each channel is connected to 8 ways. However, embodiments are not limited to the example where the number of channels of the nonvolatile memory device 200 is "8" and the number of ways of the nonvolatile memory device 200 is "8".

In the nonvolatile memory devices NVM11, . . . , NVM88, nonvolatile memory devices whose first index numbers are identical may be connected to the same channel, and nonvolatile memory devices whose second index numbers are identical may be connected to corresponding ways. For example, the nonvolatile memory devices NVM11, NVM12, NVM13, NVM14, NVM15, NVM16, NVM17, and NVM18 may be controlled by the controller 100 through a same channel (e.g. channel CH_0). The nonvolatile memory devices NVM11, NVM21, NVM31, NVM41, NVM51, NVM61, NVM71, and NVM81 may be controlled by the controller 100 through a same way of the same channel or corresponding ways of different channels. For example, the ways W11, Wj1, . . . , Wk1, and Wm1 of FIG. 2 may be corresponding ways of different channels. Likewise, the ways W12, Wj2, . . . , Wk2, and Wm2 of FIG. 2 may be corresponding ways of different channels.

In an embodiment, channels illustrated adjacent to each other in the embodiments of FIGS. 10 to 17 may be channels adjacent to each other in the nonvolatile memory device 200. As in the above description, in an embodiment, ways illustrated adjacent to each other on the same channel may be ways adjacent to each other in the nonvolatile memory device 200.

In the embodiments of FIGS. 10 to 17, the bit data PPN_BIT constituting the mapping entry MAP_ENTRY may include a channel bit CH_BIT, a way bit WAY_BIT, and an other bit OTHER_BIT. At least a portion of the channel bit CH_BIT may include information indicating a channel associated with the data input/output operation. At least a portion of the way bit WAY_BIT may include information indicating a way associated with the data input/output operation. At least a portion of the other bit OTHER_BIT may include information indicating a block, a plane, a page, and/or a mapping unit MapUnit associated with the data input/output operation. In an embodiment, the channel bit CH_BIT may include three bits [2:0] to distinguish 8 channels, and the way bit WAY_BIT may include three bits [2:0] to distinguish 8 ways. The bit information BIT_INFO inserted into the bit data PPN_BIT constituting of the mapping entry MAP_ENTRY may be determined based on the logical page number LPN, and the remaining bits of the bit data PPN_BIT may be determined from the second physical address PA_2.

The embodiments of FIGS. 10 to 17 show that the bit information BIT_INFO for distinguishing virtual groups in the nonvolatile memory device 200 is inserted as a portion of the channel bit CH_BIT and/or the way bit WAY_BIT. For example, in the embodiment of FIG. 10, the bit information BIT_INFO is illustrated as inserted at bit CH[2] of the channel bit CH_BIT, and in the embodiment of FIG. 11, the bit information BIT_INFO is illustrated as inserted at a bit CH[0] of the channel bit CH_BIT. An insertion position of the bit information BIT_INFO may be based on a structure in which the nonvolatile memory device 200 is managed by using virtual groups. That is, the insertion position of the bit information BIT_INFO may be based on a structure in which the nonvolatile memory devices NVM11, . . . , NVM88 are classified into virtual groups.

In an embodiment, the controller 100 may classify the nonvolatile memory devices NVM11, . . . , NVM88 into a plurality of virtual groups based on channels. FIGS. 10 to 13 illustrate embodiments in which the controller 100 classifies the nonvolatile memory devices NVM11, . . . , NVM88 into a plurality of virtual groups based on channels.

Figure 10:
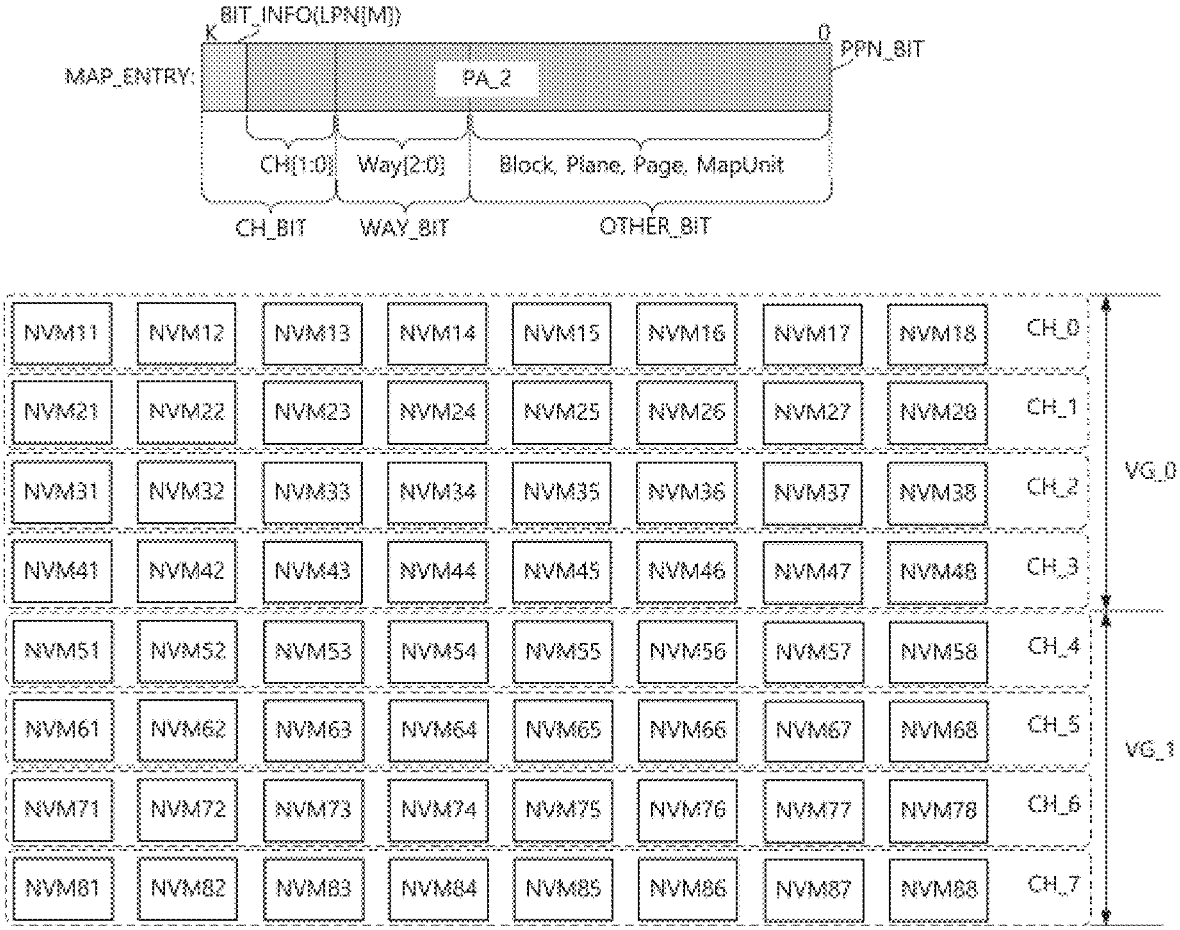
FIGS. 10 to 17 are diagrams describing structures in which a storage device is managed based on mapping entries of a logical address-physical address mapping table and corresponding virtual groups, according to various embodiments.

For example, referring to FIG. 10, the controller 100 may classify the nonvolatile memory devices NVM11, . . . , NVM88 into two virtual groups each including 4 channels adjacent to each other from among the 8 channels. The channels CH_0, CH_1, CH_2, and CH_3 adjacent to each other may be classified as a first virtual group VG_0, and the remaining channels CH_4, CH_5, CH_6, and CH_7 adjacent to each other may be classified as a second virtual group VG_1. In this case, the bit information BIT_INFO for distinguishing a plurality of virtual groups may be composed of one bit and may be inserted at a most significant bit (MSB) position (e.g., CH[2]) of the channel bit CH_BIT (or into the channel bit CH_BIT as the most significant bit MSB).

Figure 11:
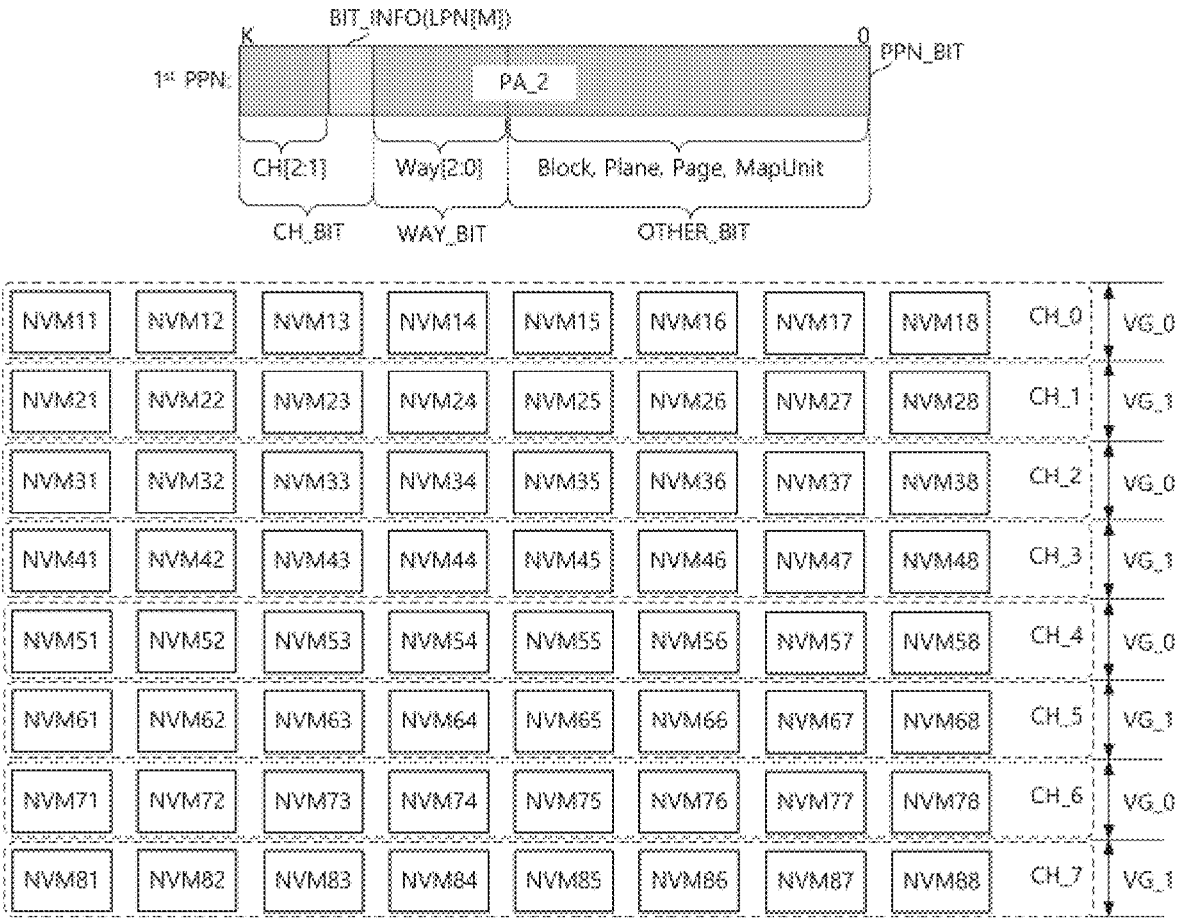

Referring to FIG. 11, the controller 100 may classify the nonvolatile memory devices NVM11, . . . , NVM88 into two virtual groups each including 4 channels not adjacent to each other from among the 8 channels. Two channels adjacent to each other from among the plurality of channels into different virtual groups based on the bit information. For example, the channels CH_0, CH_2, CH_4, and CH_6 not adjacent to each other may be classified as the first virtual group VG_0, and the remaining channels CH_1, CH_3, CH_5, and CH_7 not adjacent to each other may be classified as the second virtual group VG_1. In this case, the bit information BIT_INFO for distinguishing a plurality of virtual groups may be composed of one bit and may be inserted at a least significant bit (LSB) position (e.g., CH[0]) of the channel bit CH_BIT (or into the channel bit CH_BIT as the least significant bit LSB).

Figure 12:
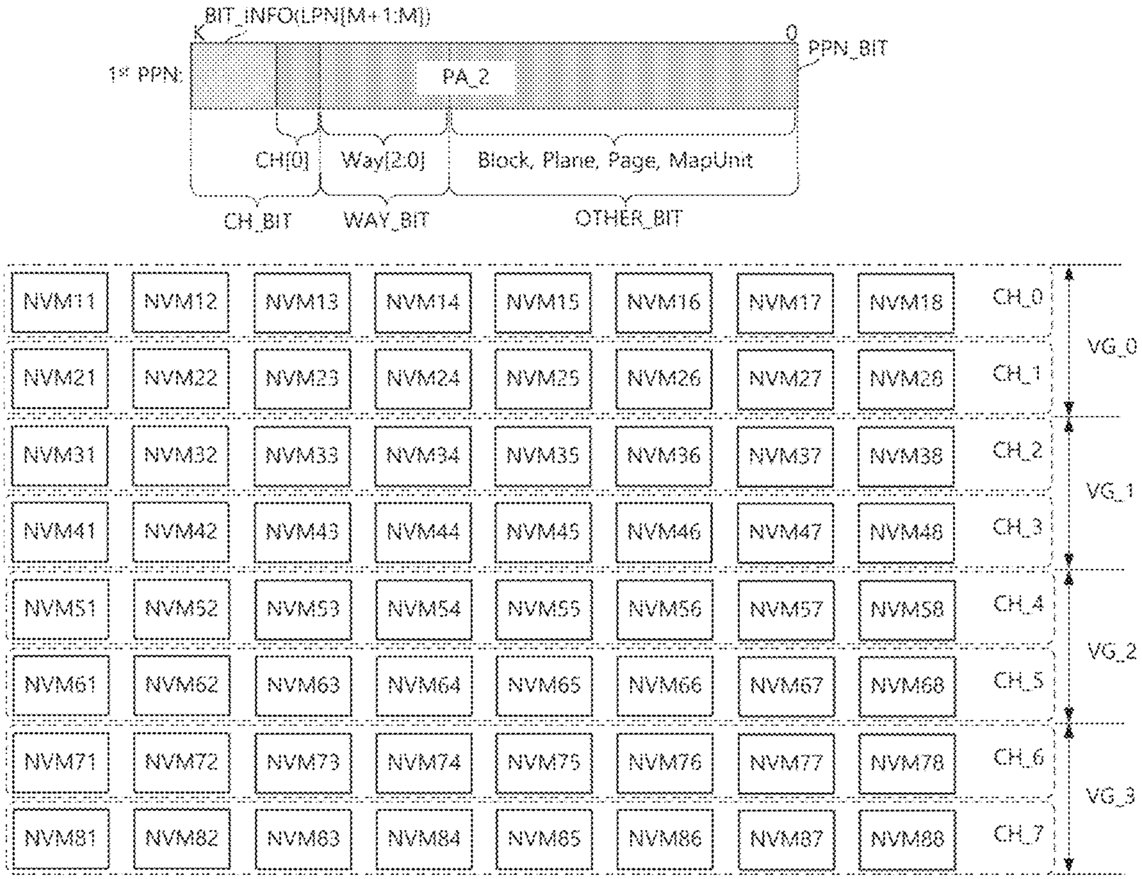

Referring to FIG. 12, the controller 100 may classify the nonvolatile memory devices NVM11, . . . , NVM88 into four virtual groups each including 2 channels adjacent to each other from among the 8 channels. The channels CH_0 and CH_1 adjacent to each other may be classified as a first virtual group VG_0, and the channels CH_2 and CH_3 adjacent to each other may be classified as a second virtual group VG_1. The channels CH_4 and CH_5 adjacent to each other may be classified as a third virtual group VG_2, and the channels CH_6 and CH_7 adjacent to each other may be classified as a fourth virtual group VG_3. In this case, the bit information BIT_INFO for distinguishing a plurality of virtual groups may be composed of two bits and may be inserted at most significant bit (MSB) positions (e.g., CH[2:1]) of the channel bit CH_BIT (or into the channel bit CH_BIT as the most significant bits MSBs).

Figure 13:
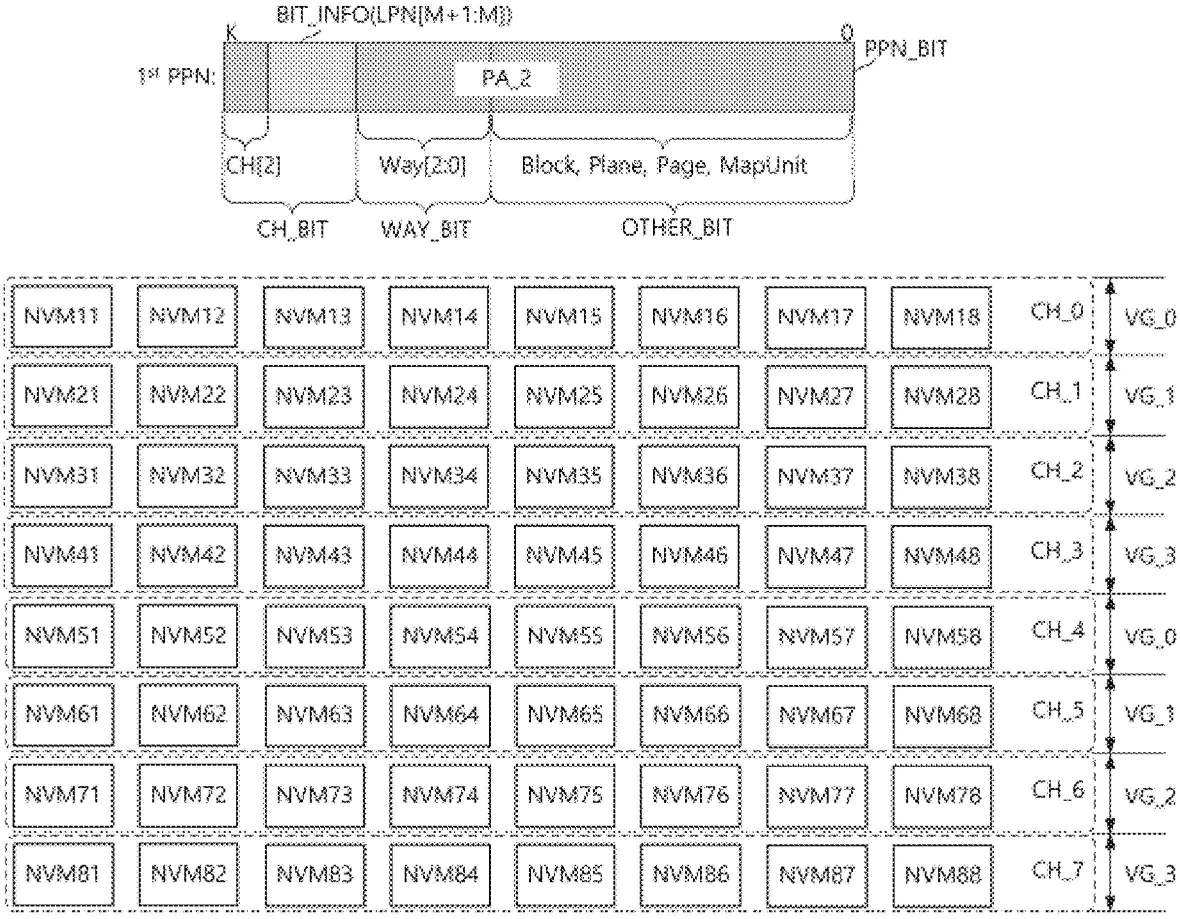

Referring to FIG. 13, the controller 100 may classify the nonvolatile memory devices NVM11, . . . , NVM88 into four virtual groups each including 2 channels not adjacent to each other from among the 8 channels. The first virtual group VG_0 may include the channels CH_0 and CH_4 not adjacent to each other; the second virtual group VG_1 may include the channels CH_1 and CH_5 not adjacent to each other; the third virtual group VG_2 may include the channels CH_2 and CH_6 not adjacent to each other; and, the fourth virtual group VG_3 may include the channels CH_3 and CH_7 not adjacent to each other. In this case, the bit information BIT_INFO for distinguishing a plurality of virtual groups may be composed of two bits and may be inserted at least significant bit (LSB) positions (e.g., CH[1:0]) of the channel bit CH_BIT (or into the channel bit CH_BIT as the least significant bits LSBs).

In an embodiment, the controller 100 may classify the nonvolatile memory devices NVM11, . . . , NVM88 into a plurality of virtual groups based on ways. FIGS. 14 to 17 illustrate embodiments in which the controller 100 classifies the nonvolatile memory devices NVM11, . . . , NVM88 into a plurality of virtual groups based on ways.

Figure 14:
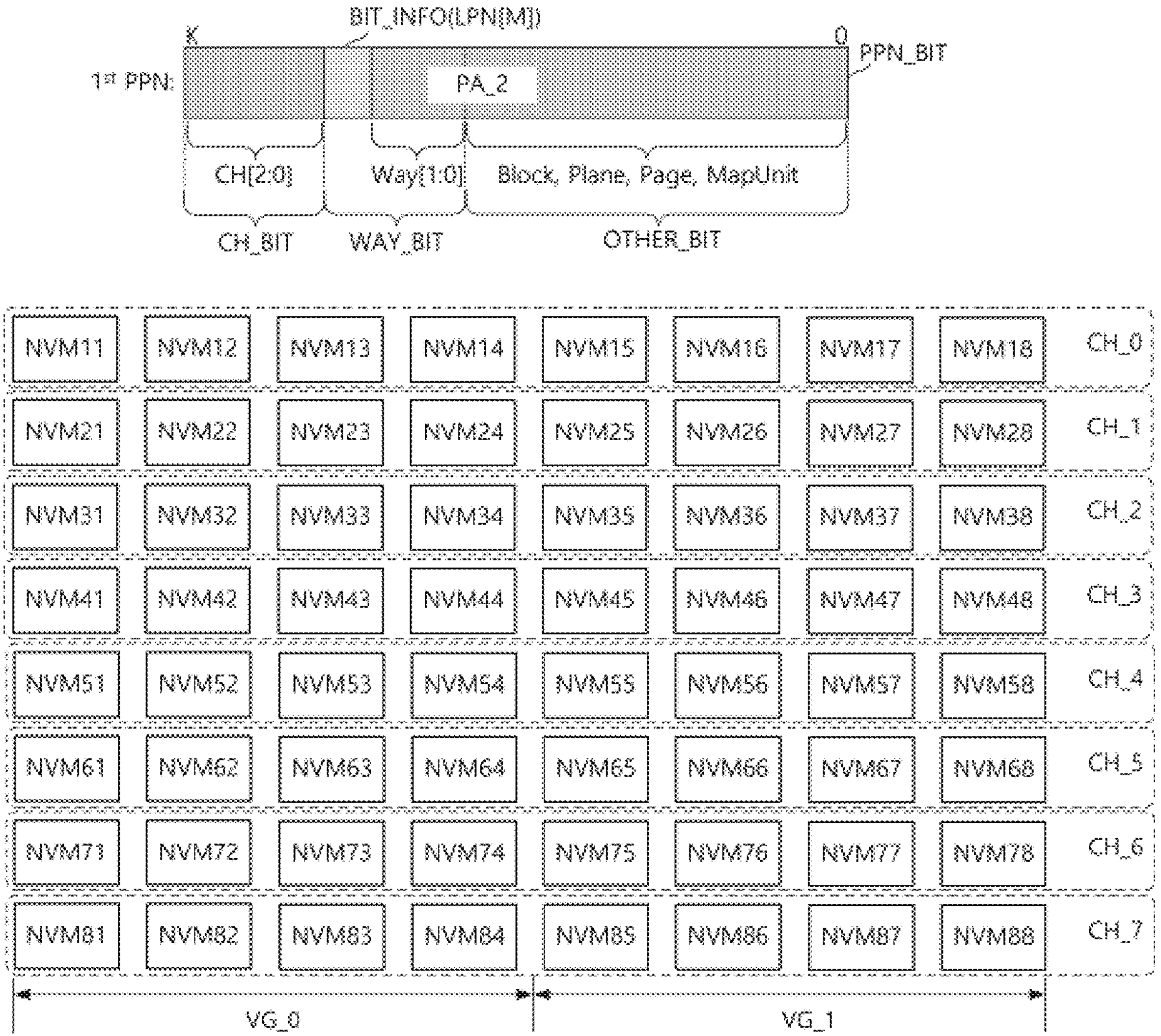

As in the above description given with reference to FIGS. 10 to 13, referring to FIG. 14, the controller 100 may classify the nonvolatile memory devices NVM11, . . . , NVM88 into two virtual groups each including 4 ways adjacent to each other from among the 8 ways. In this case, the bit information BIT_INFO for distinguishing a plurality of virtual groups may be composed of one bit and may be inserted at a most significant bit (MSB) position (e.g., WAY[2]) of the way bit WAY_BIT (or into the way bit WAY_BIT as the most significant bit MSB).

Figure 15:
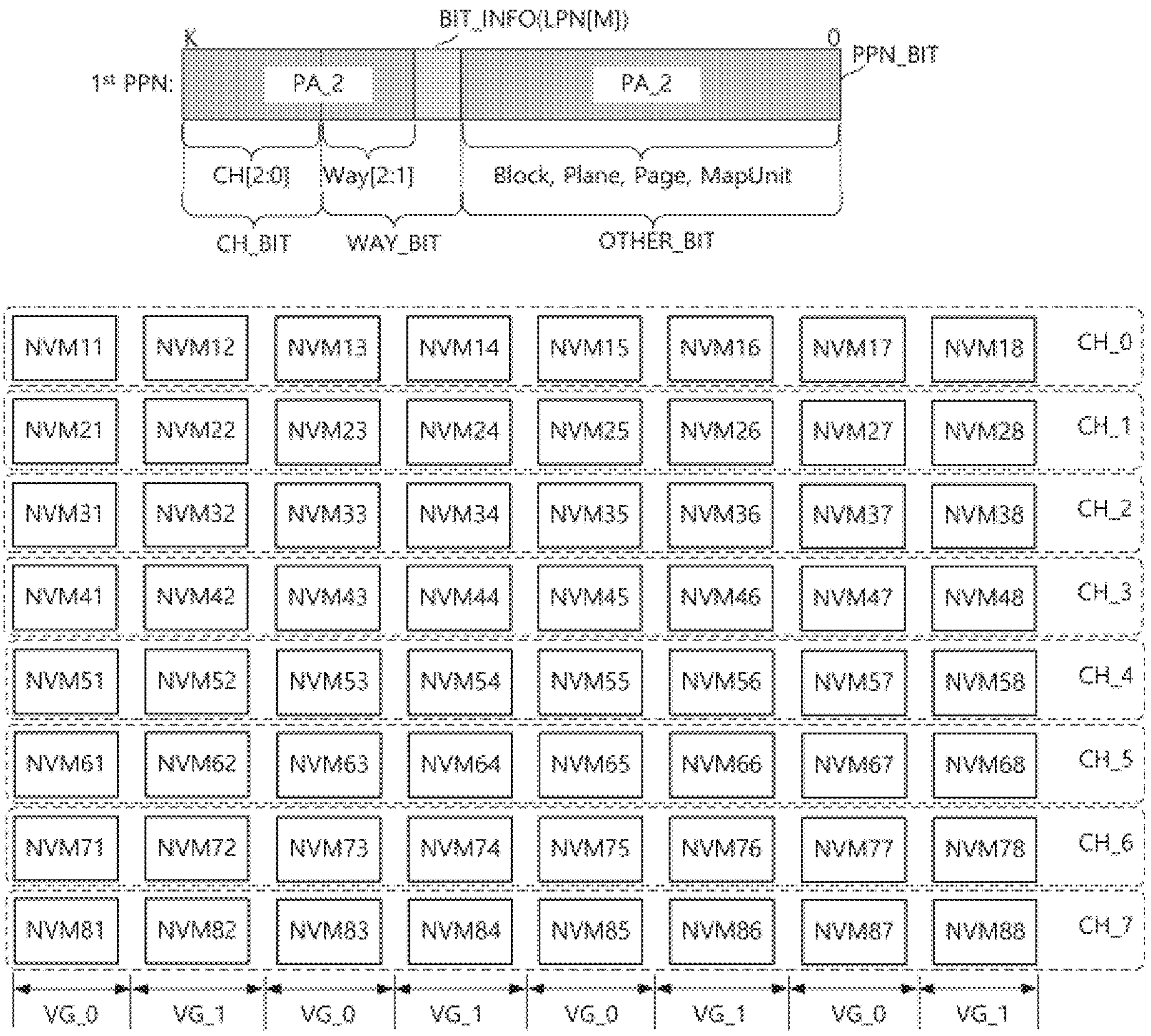

Referring to FIG. 15, the controller 100 may classify the nonvolatile memory devices NVM11, . . . , NVM88 into two virtual groups each including 4 ways not adjacent to each other from among the 8 ways. In this case, the bit information BIT_INFO for distinguishing a plurality of virtual groups may be composed of one bit and may be inserted at a least significant bit (LSB) position (e.g., WAY[0]) of the way bit WAY_BIT (or into the way bit WAY_BIT as the least significant bit LSB).

Figure 16:
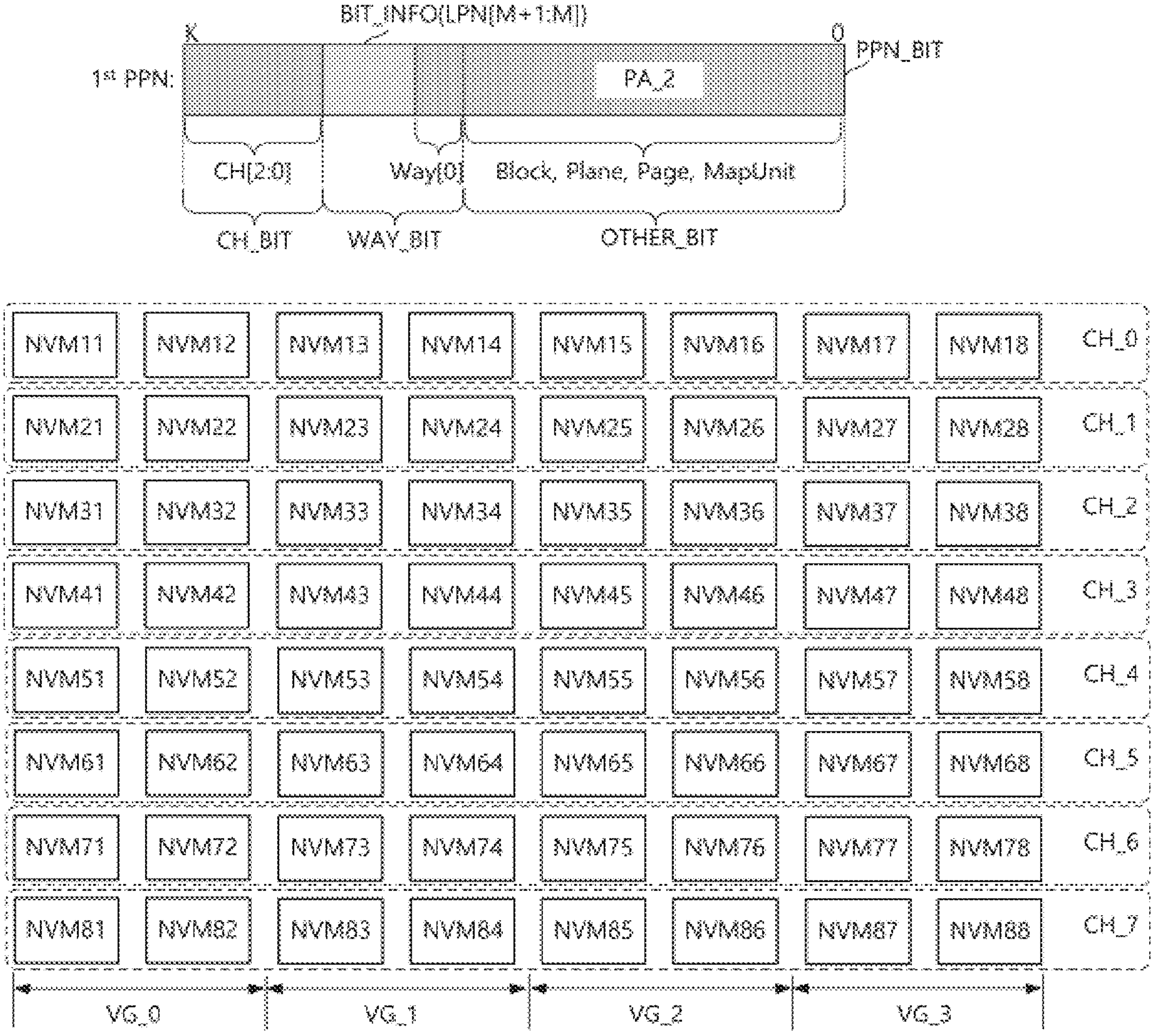

Referring to FIG. 16, the controller 100 may classify the nonvolatile memory devices NVM11, . . . , NVM88 into four virtual groups each including 2 ways adjacent to each other from among the 8 ways. In this case, the bit information BIT_INFO for distinguishing a plurality of virtual groups may be composed of two bits and may be inserted at most significant bit (MSB) positions (e.g., WAY[2:1]) of the way bit WAY_BIT (or into the way bit WAY_BIT as the most significant bits MSBs).

Figure 17:
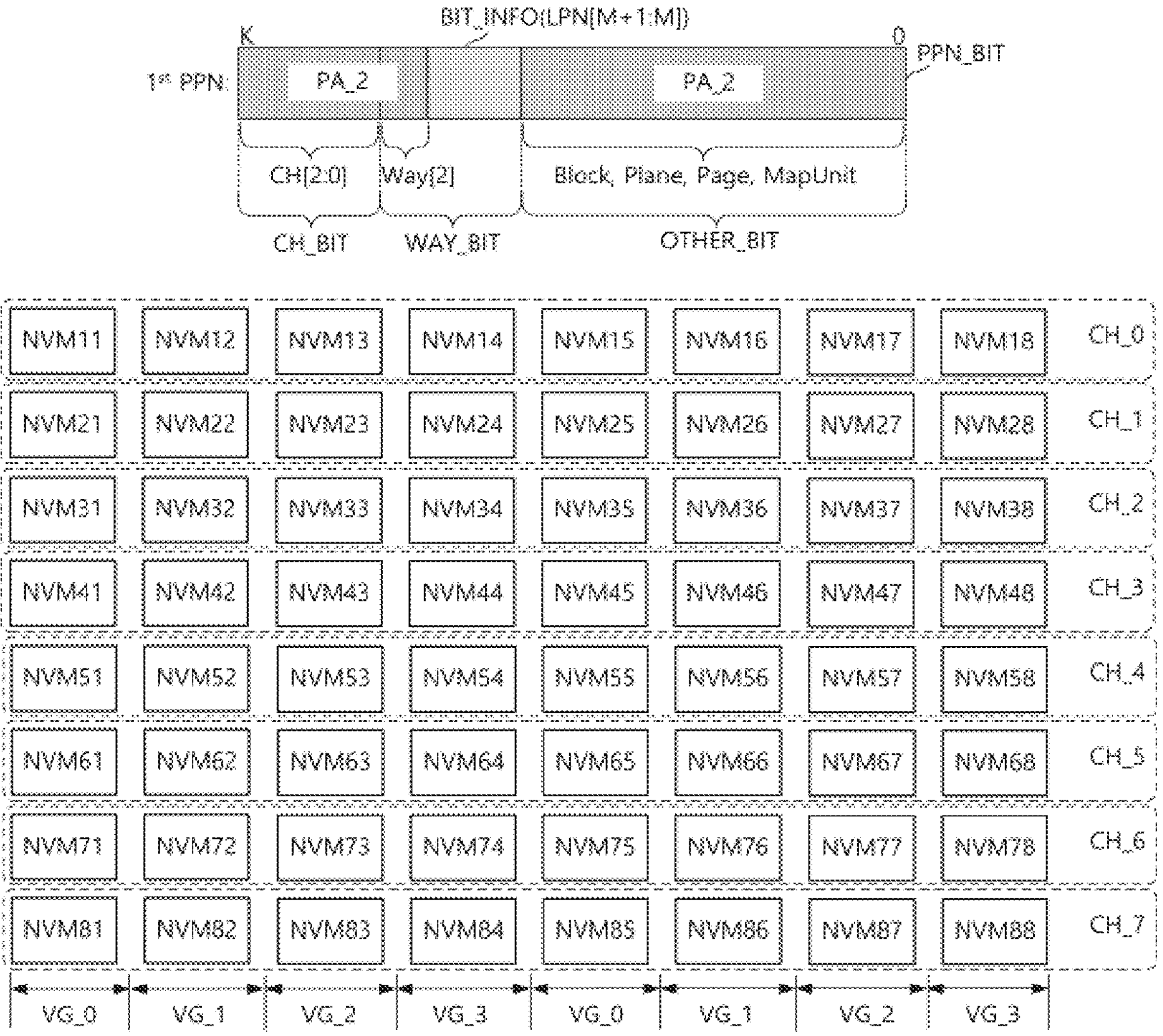

Referring to FIG. 17, the controller 100 may classify the nonvolatile memory devices NVM11, . . . , NVM88 into four virtual groups each including 2 ways not adjacent to each other from among the 8 ways. In this case, the bit information BIT_INFO for distinguishing a plurality of virtual groups may be composed of two bits and may be inserted at least significant bits (LSB) positions (e.g., WAY[1:0]) of the way bit WAY_BIT (or into the way bit WAY_BIT as the least significant bits LSBs).

Figure 18:
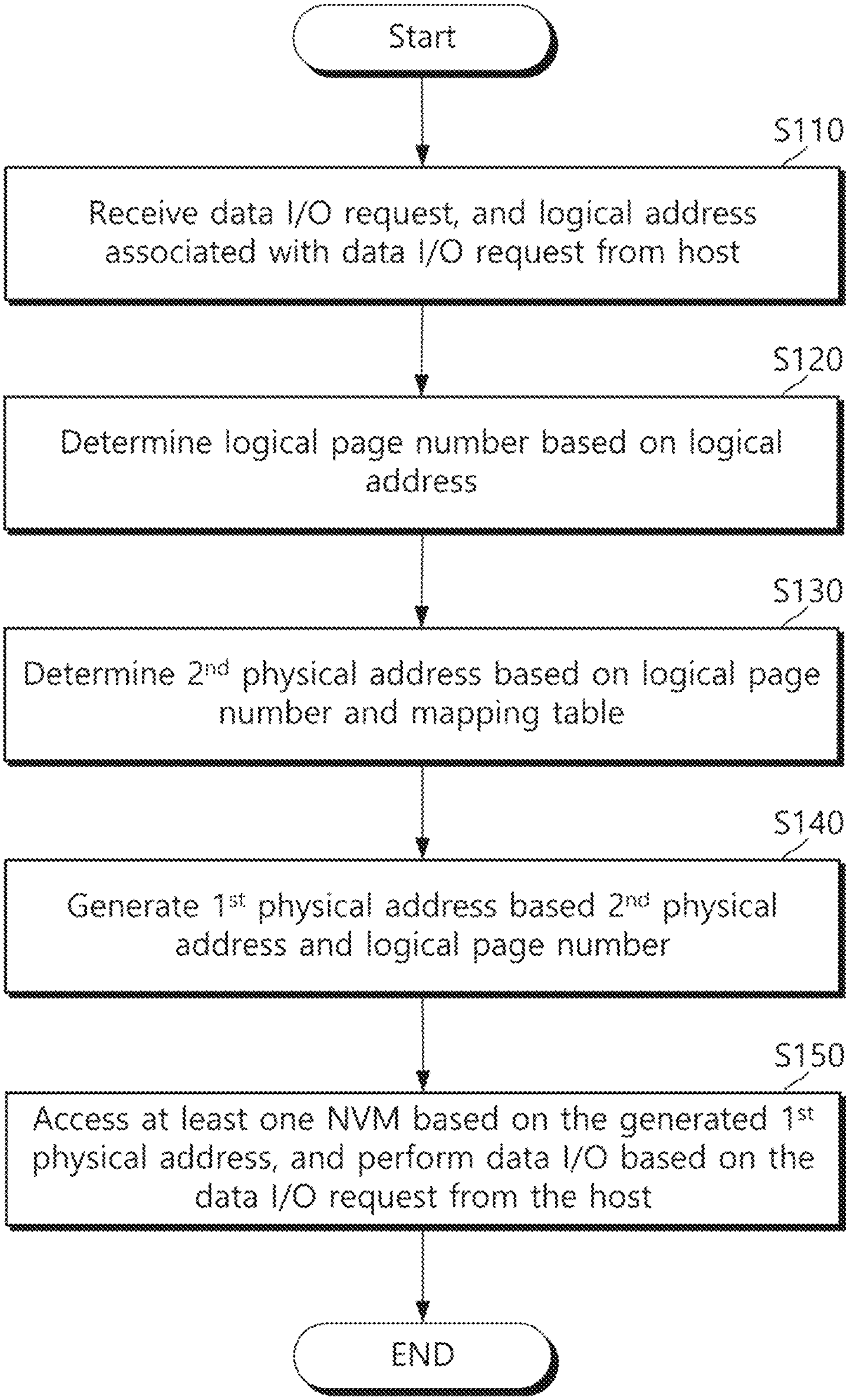
FIG. 18 is a diagram describing an operating method of a storage device according to an embodiment.

FIG. 18 is a diagram describing an operating method of a storage device according to an embodiment. The operating method of the storage device of FIG. 18 may be performed by the storage device 20 of FIGS. 1, 2, and 3.

In operation S110, the controller 100 may receive a data input/output request and a logical address associated with the data input/output request from the host 10. The logical address may be the logical block address LBA.

In operation S120, the controller 100 may determine the logical page number LPN based on the logical address. For example, the controller 100 may determine the logical page number LPN based on the logical block address LBA.

In operation S130, the controller 100 may determine a second physical address based on the logical page number LPN and a mapping table. The controller 100 may search for a mapping entry corresponding to the logical page number LPN from among a plurality of mapping entries included in the mapping table. Each mapping entry may store information about correlation of a logical page number and a physical address. The controller 100 may determine the second physical address included in the found mapping entry as a physical address corresponding to the logical page number LPN.

In operation S140, the controller 100 may generate a first physical address based on the second physical address and the logical page number LPN. For example, the controller 100 may determine bit information being bits corresponding to preset bit positions from among bits of bit data constituting the logical page number LPN and may generate the first physical address by combining the bit information and the second physical address.

In an embodiment, when the nonvolatile memory device 200 is divided into a plurality of virtual groups, the controller 100 may insert bit information at different positions of the first physical address, based on a structure in which the plurality of virtual groups are managed. For example, when the nonvolatile memory device 200 is divided into a plurality of virtual groups based on channels, the controller 100 may insert bit information at bits indicating channels from among the bits of the first physical address. When the nonvolatile memory device 200 is divided into a plurality of virtual groups based on ways, the controller 100 may insert bit information at bits indicating ways from among the bits of the fourth physical address. In some embodiments, depending on whether adjacent channels are classified as the same virtual group, the controller 100 may insert bit information as the most significant bit(s) or the least significant bit(s) among bits indicating channels.

In operation S150, the controller 100 may access at least one of a plurality of nonvolatile memory devices constituting the nonvolatile memory device 200 based on the first physical address and may perform the data input/output operation of data corresponding to the data I/O request from the host. When the nonvolatile memory device 200 is divided into a plurality of virtual groups, the controller 100 may distinguish the plurality of virtual groups based on bit information of the first physical address.

A storage device according to various embodiments may reduce the size of information correlating a logical address with a physical address of the storage device managed based on a plurality of virtual groups.

While various embodiments have been described with reference to the drawings, it will be apparent to those of ordinary skill in the art that various changes and modifications may be made thereto without departing from the spirit and scope of the present disclosure as set forth in the following claims.

What is claimed is:

1. A storage device comprising:

at least one nonvolatile memory device configured to store or read data; and a controller configured to control the at least one nonvolatile memory device based on a first physical address of the at least one nonvolatile memory device and to perform a data input/output request from a host, wherein the controller generates the first physical address based on bit information that is included in a logical address associated with the data input/output request, that is indicated by bits at a preset bit position in the logical address, that corresponds to one of a plurality of virtual groups, and based on a second physical address of the at least one nonvolatile memory device stored in a mapping table, wherein the mapping table includes information about a correlation of the logical address and the second physical address, and wherein the controller inserts the bit information into the first physical address.

2. The storage device of claim 1, wherein the logical address is a logical page number (LPN).

3. The storage device of claim 1, wherein the controller distinguishes the plurality of virtual groups of the at least one nonvolatile memory device based on the bit information, and controls the at least one nonvolatile memory device based on the plurality of virtual groups.

4. The storage device of claim 3, wherein a number of the bits of the bit information is based on a number of the plurality of virtual groups.

5. The storage device of claim 3, wherein the controller includes:

a meta information manager configured to generate the first physical address by combining the second physical address and the bit information.

6. The storage device of claim 5, wherein the meta information manager generates the first physical address by inserting the bit information in the first physical address at an insertion position based on a structure in which the at least one nonvolatile memory device is divided into the plurality of virtual groups.

7. The storage device of claim 3, wherein the mapping table includes a plurality of virtual group mapping tables respectively corresponding to the plurality of virtual groups, and wherein the controller controls the at least one nonvolatile memory device based on a virtual group mapping table corresponding to the bit information from among the plurality of virtual group mapping tables.

8. The storage device of claim 3, wherein the second physical address does not include information for distinguishing the plurality of virtual groups.

9. The storage device of claim 3, wherein the controller is configured to:

control the at least one nonvolatile memory device through a plurality of channels and a plurality of ways connected to each of the plurality of channels; and classify the plurality of channels or the plurality of ways into the plurality of virtual groups based on the bit information.

10. The storage device of claim 3, wherein the controller is configured to:

control the at least one nonvolatile memory device through a plurality of channels;

classify two channels adjacent to each other from among the plurality of channels as a first virtual group, based on the bit information of a first position in the first physical address; or classify two channels adjacent to each other from among the plurality of channels into different virtual groups based on the bit information of a second position in the first physical address.

11. The storage device of claim 3, wherein the controller is configured to:

control the at least one nonvolatile memory device through a plurality of channels and a plurality of ways connected to each of the plurality of channels;

classify two ways adjacent to each other from among the plurality of ways as a same virtual group, based on the bit information of a first position in the first physical address; or classify two ways adjacent to each other from among the plurality of ways into different virtual groups based on the bit information of a second position in the first physical address.

12. The storage device of claim 1, wherein the controller allocates a free block based on the bit information, in response to a write request received from the host.

13. A storage device comprising:

at least one nonvolatile memory device configured to store or read data; and a controller configured to control the at least one nonvolatile memory device based on a first physical address and to perform a workload requested by a host, wherein the controller is configured to:

divide the at least one nonvolatile memory device into a plurality of virtual groups, based on bit information and based on a physical address of the at least one nonvolatile memory device stored in a mapping table, the bit information being included in a logical address associated with the workload, being indicated by bits at preset bit positions in the logical address, and corresponding to one of the plurality of virtual groups;

generate the first physical address and insert the bit information into the first physical address; and distinguish among the plurality of virtual groups based on the first physical address to perform the workload associated with the plurality of virtual groups.

14. The storage device of claim 13, wherein the controller distinguishes the plurality of virtual groups based on the bit information.

15. The storage device of claim 13, further comprising:

a plurality of flash controllers connected to perform the workload by controlling at least one of a plurality of channels to which the at least one nonvolatile memory device is connected, wherein the controller allocates the workload to one of the plurality of flash controllers based on the bit information.

16. A method which is performed by a controller of a storage device, the method comprising:

receiving, at the controller, a data input/output request and a logical address associated with the data input/output request from a host;

determining, at the controller, a logical page number based on the logical address;

determining, at the controller, a second physical address based on the logical page number and a mapping table;

generating, at the controller, a first physical address by combining the second physical address and bit information that is included in the logical page number at a preset bit position in the logical page number and that corresponds to one of a plurality of virtual groups; and controlling, at the controller, at least one nonvolatile memory device based on the first physical address to perform an input/output of data associated with the data input/output request, wherein the mapping table includes information about a correlation of the logical page number and the second physical address.

17. The method of claim 16, further comprising:

inserting, at the controller, the bit information into the first physical address, as a portion of the first physical address, based on a structure in which the plurality of virtual groups that are set in advance are managed.

18. The method of claim 17, further comprising:

when structures for managing the plurality of virtual groups are different, inserting the bit information at different positions of the first physical address.

19. The method of claim 17, further comprising:

distinguishing, at the controller, the plurality of virtual groups based on the bit information of the first physical address to perform the input/output of the data.

20. The method of claim 17, further comprising:

controlling, at the controller, the at least one nonvolatile memory device through a plurality of channels and a plurality of ways connected to each of the plurality of channels; and classifying, at the controller, the plurality of channels or the plurality of ways into the plurality of virtual groups based on the bit information.

* * * * *